(12) United States Patent
Stewart et al.

(10) Patent No.: US 11,997,421 B2
(45) Date of Patent: May 28, 2024

(54) CABLE DEVICE

(71) Applicant: Lenovo (Singapore) Pte. Ltd., Singapore (SG)

(72) Inventors: Aaron Michael Stewart, Raleigh, NC (US); Ellis Anderson, Greensboro, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 328 days.

(21) Appl. No.: 17/138,276

(22) Filed: Dec. 30, 2020

(65) Prior Publication Data

US 2022/0210367 A1 Jun. 30, 2022

(51) Int. Cl.
*H04N 7/10* (2006.01)
*G08B 5/36* (2006.01)
*G08B 21/18* (2006.01)

(52) U.S. Cl.
CPC ............ *H04N 7/108* (2013.01); *G08B 5/36* (2013.01); *G08B 21/18* (2013.01)

(58) Field of Classification Search
None
See application file for complete search history.

(56) References Cited

U.S. PATENT DOCUMENTS

| | | | | |
|---|---|---|---|---|
| 2004/0224768 A1* | 11/2004 | Hussaini | ................. | A63F 13/24 463/37 |
| 2009/0040327 A1* | 2/2009 | Ono | .................... | H04N 5/23203 348/222.1 |
| 2016/0253282 A1* | 9/2016 | Bowers | ............... | G06F 13/4022 710/316 |
| 2016/0335731 A1* | 11/2016 | Hall | ...................... | G06Q 10/067 |
| 2018/0063477 A1* | 3/2018 | Yu | ............................ | H04N 7/15 |
| 2020/0064960 A1* | 2/2020 | Munemoto | ......... | G06F 3/04883 |
| 2021/0250687 A1* | 8/2021 | Cline | ..................... | H04R 27/00 |
| 2022/0047175 A1* | 2/2022 | Hunt | .................... | A61B 5/0053 |

OTHER PUBLICATIONS

Omron, White Paper, MEMS Thermal Sensor, Issue Date: Sep. 2018 (7 pages).
Omron, MEMS Thermal Sensors, D6T, Catalog, Apr. 2019 (20 pages).
Omron, MEMS Thermal Sensors, D6T, User's Manual (A284-E1-03), 1019 (0718)(O), Oct. 2019 (24 pages).
On Semiconductor, FUSB301A, Autonomous USB Type-C Controller with Configurable I2C Address, Jun. 2018—Rev. 0, Publication Order No. FUSB301A/D (13 pages).
Texas Instruments, TIDA-00630 TI Type-C Dock, REVB, Aug. 7, 2015 (10 pages).
Texas Instruments, TI Designs, TIDA-01243 USB Type-CTM Mini Dock, TIDUC52—Aug. 5, 2016 (84 pages).
USB 3.0 Promoter Group, Universal Serial Bus Type-C Port Controller Interface Specification, Revision 2.0, Version 1.0, Oct. 2017 (103 pages).
Omron, 2JCIE-BU, Environment Sensor (USB Type), Cat. No. A281-E1-01, 0618 (0618), Jun. 2018 (5 pages).

(Continued)

*Primary Examiner* — Samira Monshi
(74) *Attorney, Agent, or Firm* — Brian J. Pangrle

(57) ABSTRACT

A device can include a video cable that includes opposing ends; and a human presence sensor operatively coupled to the video cable between the opposing ends.

20 Claims, 14 Drawing Sheets

(56) References Cited

OTHER PUBLICATIONS

Omron, White Paper, Environment Sensor, Issue Date: Jun. 2018 (8 pages).
SMSC, UFX7000, USB 3.0 Super-Speed Graphics Controller with VGA, HDMI/DVI and Digital RGB Interfaces, Datasheet, Revision 1.4 (Jun. 24, 2013), Jun. 2013 (53 pages).
Digi-Key, Giovino, Bill, Quickly Design a System to Reliably Sense Human Presence, Jan. 22, 2019 (5 pages).

* cited by examiner

USB-C Receptacle 804 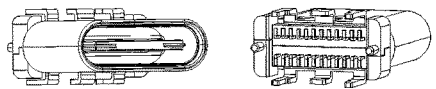

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1- | VBus | CC1 | D+ | D- | SBU1 | VBus | RX2- | RX2+ | GND |
| GND | RX1+ | RX1- | VBus | SBU2 | D- | D+ | CC2 | VBus | TX2- | TX2+ | GND |
| B12 | B11 | B10 | B9 | B8 | B7 | B6 | B5 | B4 | B3 | B2 | B1 |

USB-C Plug 808 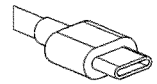

| A12 | A11 | A10 | A9 | A8 | A7 | A6 | A5 | A4 | A3 | A2 | A1 |
|---|---|---|---|---|---|---|---|---|---|---|---|
| GND | RX2+ | RX2- | VBus | SBU1 | D- | D+ | CC | VBus | TX1- | TX1+ | GND |
| GND | TX2+ | TX2- | VBus | VConn |  |  | SBU2 | VBus | RX1- | RX1+ | GND |
| B1 | B2 | B3 | B4 | B5 | B6 | B7 | B8 | B9 | B10 | B11 | B12 |

| Display 810 | TX1+/- (A2/A3) | RX1+/- (B11/B10) | TX2+/- (B2/B3) | RX2+/- (A11/A10) |
|---|---|---|---|---|
| USB & DP 812 | SS/SS+ | SS/SS+ | DP Main L1 | DP Main L0 |
|  | DP Main L1 | DP Main L0 | SS/SS+ | SS/SS+ |
| DP 814 | DP Main L2 | DP Main L3 | DP Main L1 | DP Main L0 |
|  | DP Main L1 | DP Main L0 | DP Main L2 | DP Main L3 |

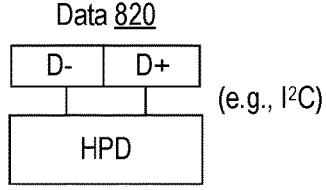

FIG. 8

CABLE DEVICE

TECHNICAL FIELD

Subject matter disclosed herein generally relates to cable devices.

BACKGROUND

A cable device can be utilized to electronically connect a computing device to a display device.

SUMMARY

A device can include a video cable that includes opposing ends; and a human presence sensor operatively coupled to the video cable between the opposing ends. Various other devices, apparatuses, assemblies, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

FIG. 8 is a series of diagrams of USB-C features;

DETAILED DESCRIPTION

Figure 1:
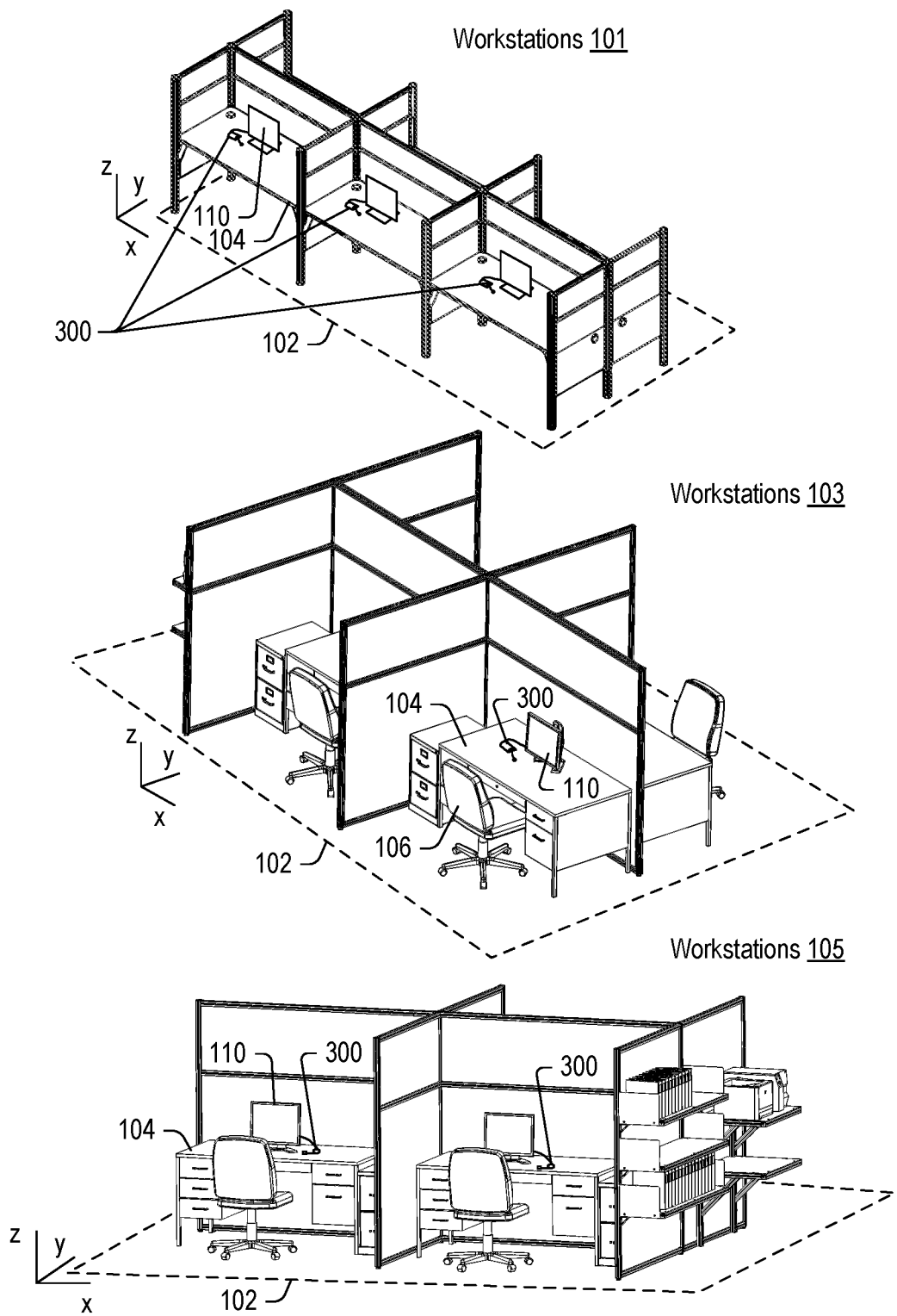
FIG. 1 is a series of perspective views of examples of workstations.

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

As an example, a device can include a video cable that includes opposing ends; and a human presence sensor operatively coupled to the video cable between the opposing ends. Such a device may be referred to as a cable device. For example, such a device includes a cable where the cable can be utilized for transmission of at least video data that can be rendered to a display (e.g., as text, graphics, images, etc.).

As an example, a device can be a cable device with an in-line sensor. For example, consider a human presence sensor that can detect the presence of a human, directly and/or indirectly. In such an example, the device may be used for one or more of workstation occupancy and workstation booking.

As an example, a device can be a "smart office" device that increases digital intelligence of an office. For example, consider an office environment that can include one or more workstations that can be utilized in a shared manner. Such an approach to humans and spaces may be referred to as "hoteling".

Hoteling involves office management in which workers can dynamically schedule their use of workspaces such as desks, cubicles, and offices. Often, it may be viewed as an alternative approach to the more traditional method of permanently assigned seating. Hoteling may include managing via one or more of first-come-first-served (e.g., FCFS), reservation-based unassigned seating, reservation-based assigned seating, etc. As an example, hoteling can include management of seating via a practice referred to as "hot desking", where a worker may choose a workspace upon arrival, which may be from a variety of workspaces, a select group of workspaces, etc.

As an example, hoteling can include a human reserving a workstation for temporary use for a period of time, which may be minutes, hours, days, etc. Hoteling can be in some instances more efficient than a one-workstation-per-human scenario (e.g., one-workstation-per-employee, contractor, etc.). Hoteling may create various opportunities for people to mingle and collaborate.

Hoteling has been viewed as a practice driven at least in part by increased worker mobility (e.g., as enabled by advances in mobile technology, etc.). For example, organizations whose workers travel frequently, or with growing remote or mobile workforces, can be suitable for hoteling. Hoteling, in some instances, reflects a shift from an employer's office space being a main "office base" to being more of a come-and-go "hospitality hub." With an increasing trend of work-from-home, an office space may demand lesser space, fewer workstations, etc., though, depending on health concerns, with various measures to increase sanitation, reduce risk of transmissible pathogens, etc.

As an example, a workspace with workstations may include one or more devices that can be utilized for tasks such as booking, collection of utilization data, charging for personal devices, specific input/output for personal devices in a practical, simple and interactive form factor, etc.

As an example, a cable device can include one or more types of circuitry. As an example, a cable device may include an electromagnetic energy interference choke (e.g., EMI choke). As an example, a cable device may be an Internet of things (IoT) type of device.

As an example, a cable device can include a cable with a connector that electronically connects to a display device where the connector may be fixed, fixable or removable. For example, a fixed connector may be integrally molded with a component or components of a display device. As an example, a fixable connector may include one or more of screws, bayonets, threads, etc., that can be utilized to attach the fixable connector to a display device in a manner such that it is not readily removable by a user (e.g., may require a tool, tools, advance knowledge of how to utilize the attachment mechanism, etc.). As to a removable connector, consider a standardized type of connector such as a USB type of connector, a HDMI type of connector, etc., which may be connected via an interference fit (e.g., a press fit) without a tool and with the human hand, for example, by pushing into a corresponding socket or pulling out of a corresponding socket.

In various instances, a workspace may be outfitted with ceiling, wall mount or desk mounted sensors such as image sensors. As to a desk mounted sensor, it may be clandestine or hidden such that a worker does not see it. For example, consider mounting a sensor underneath a desktop such that a user cannot readily see the sensor when standing or seated at the desktop. In such an approach, the sensor may detect the worker's legs, feet, knees, etc. In such an approach, position of a chair (e.g., a seat) may block a sensor from detecting a worker, which may occur intermittently, etc., as the worker moves the chair. Such an approach may provide sub-optimal data, which may indicate that a worker was present when not present and/or that a worker was not present when present. An under the desk approach may also be sub-optimal for sit-stand types of workstations (e.g., where a standing user stores the chair under the desk).

In various instances, a worker may desire a "clean desk" where a desktop is relatively free from clutter, which may increase available area on a desktop for documents, devices, etc.

As an example, where a display device includes a connector that can transmit power, a cable device may transmit such power to a computing device. For example, consider a worker connecting a laptop computer to the cable device where the laptop computer can receive power from the display device via the cable device. In such an example, the power may be provided directly and/or indirectly to circuitry of the laptop computer. For example, consider power being directed to charging circuitry that supplies power to charge a rechargeable battery of the laptop computer where the laptop computer is powered via power received from the rechargeable battery. In such an example, video data may be transmitted from the laptop computer to the display device while power may be transmitted from the display device to the laptop computer. In such an example, a worker may forego use of a power brick (e.g., an AC/DC adapter, etc.) that plugs into a wall outlet (e.g., a 120 VAC, 240 VAC, etc.). In such an example, usable area of a desktop may be increased (e.g., rather than being occupied by a power brick and associated power brick cable. As an example, where a desktop has less clutter, a worker may be more efficient, experience less eyestrain, etc.

As an example, a device can be modular and added to an existing external display device, for example, by placing circuitry in-line of a USB-C pass-thru cable. In such an example, the circuitry can be operatively coupled to the USB-C pass-thru cable for receipt of at least power. For example, consider power transmitted from a computing device to the circuitry and/or power transmitted from a display device that is external to the computing device. As an example, a device can house various one or more types of environmental and/or human presence detection (HPD) sensors. As an example, a device may include circuitry for stand-alone compute, one or more visible indicators and/or one or more interactive surfaces.

As an example, a USB-C cable may be split such that one or more sensors are operatively coupled to the USB-C cable where at least one of the one or more sensors is between opposing ends of the USB-C cable (e.g., between an end of one connector and an end of another connector of the USB-C cable). As an example, a cable device can be utilized to connect to a computing device to an external display at a workstation and to power the computing device. As an example, such a cable device can include a housing disposed between opposing ends of a cable where the housing can rest on a desktop (e.g., a support surface of a workstation). In such an example, the cable device can effectively replace a USB-C cable without such a housing where the housing-less USB-C can be of a type for connecting a computing device to an external display device.

As an example, a cable device may be positionable on a surface of a workstation (e.g., a desktop) in a particular orientation such that an HPD sensor of the cable device can provide for adequate sensing of occupancy at the workstation. As the HPD sensor is above the surface, its line of site can remain unobstructed whether a user is seated or standing with a chair potentially beneath the surface (e.g., at least in part under a desktop). As an example, a cable device can include circuitry that can detect a connection of a computing device and presence of a human body (e.g., via one or more HPD sensors). For example, consider circuitry that can detect a handshake signal of one or more controllers, that can detect presence and/or transmission of power, that can detect transmission of data, etc.

As an example, a device can include logic such as, for example, logic as to one or more of the following states: (i) client device attached and user present; (ii) client device attached, but no user present; and (iii) user present, but no client device attached. For example, consider circuitry that can detect a connection to a computing device and circuitry that can detect human presence.

As an example, a device can include a cable where the device may be mountable on a display device. For example, consider mounting of a housing on a bezel or a stand of a display device such that a human presence detector carried by the housing can detect human presence within a field of view (FOV) that corresponds to a human that would be viewing a display of the display device. In such an example, the cable of the device may be the only portion that occupies space as it extends from a user's computing device to the housing as mounted on the display device. Such an approach may help to minimize a physical footprint of added componentry to a work surface (e.g., a desktop).

Where a device includes compute circuitry, the device may provide dedicated, persistent HPD sensing independent to whether a client device is attached. As an example, consider a serial bus connection, where circuitry of a device in-line with a USB cable is powered via the serial bus connection. In such an example, transmit data (Tx) and/or receive data (Rx) to an edge device or to the cloud and can send a video signal to a resident display device to render an associated use interface (e.g., a graphical user interface, GUI). In such an example, when a client device is attached, sensing and independent Tx/Rx can continue in parallel to power and video pass thru between the client device the resident display device.

As an example, as a cable device can include features for transmission of video data, the cable device may controllably inject video data for rendering of one or more graphics, text, images, GUIs, etc., to a display device. In such an example, the video data may be controlled responsive to one or more types of signals, signal analyses, etc. For example, upon connection of a connector of a cable device to a computing device, video data to render a green icon may be transmitted for rendering by a display device that is already connected to the cable device. As an example, upon disconnection, video data to render a time, a code, an amount, etc., may be transmitted for rendering by the display device. In such an example, the cable device can be capable of rendering to the display device whether or not a computing device is connected to the cable device. In such an example, the cable device can include circuitry that can store video data and that can trigger the transmission of at least a portion of such video data (e.g., a selected portion, etc.), responsive to one or more events (e.g., connection, disconnection, timer start, timer end, human presence detected, human presence not detected, data detected, data not detected, etc.).

As an example, a device can include a cable and one or more of a screen (e.g., a touch screen, a non-touch screen, etc.), a visible status light (e.g., one or more LEDs, etc.), a status indicator associated to HPD sensing, a status indicator associated to status driving by desk booking software (e.g. a hoteling application, app, etc.), a sensor in a housing, a sensor in a connector head, an on and/or off switch or switches, an incognito switch allowing a user to be sensed via HPD, but not via a specific device being connected to the in-line device, etc.

As an example, a device can include one or more of various cable lengths and/or types to accommodate one or more of various different mountings and/or setup scenarios.

As an example, a device can include a platform that can be suitable for placement of a smartphone. In such an example, the smartphone may be utilized for one or more purposes such as, for example, logging in, payment, storage, rechargeable battery charging (e.g., wireless), utilization of the smartphone display for one or more purposes (e.g., temporarily for a status, a payment, deposit, etc.).

FIG. 1 shows various examples of workstations 101, 103 and 105. As shown, each of the workstations 101, 103 and 105 can be supported on a floor 102 and include one or more desktops 104 where, for example, one or more chairs 106 may be positioned at the one or more desktops 104 or not. In the examples of FIG. 1, the workstations 101, 103 and 105 can include one or more display devices 110, for example, each positioned on a corresponding one of the one or more desktops 104 and/or other workstation portion (e.g., wall, frame, etc.). As shown, each of the one or more desktops 104 can include a corresponding device 300 that includes a cable. In such an example, the device 300 may be referred to as a cable device where the cable allows for transmission of video data from a computing device to a corresponding one of the one or more display devices 110.

In FIG. 1, Cartesian coordinate systems (x, y and z) are shown, which may be utilized to describe one or more features of a workstation, a desktop, a display device, a chair, a user, a frame, a wall, a floor, a cable device, etc.

Figure 2A:
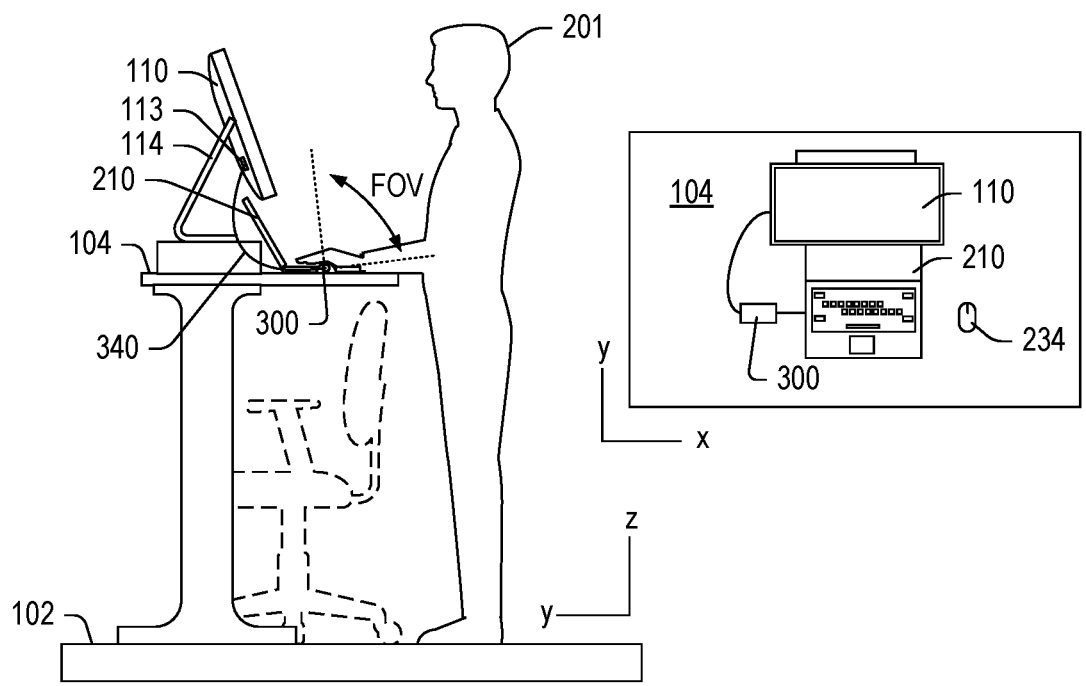
FIG. 2A and FIG. 2B are views of an example of a user at a workstation.

FIG. 2A shows an example of a user 201 standing on the floor 102 before the desktop 104 of a workstation where the display device 110 is supported by the desktop 104 via a stand 114 and where the display device 110 includes a connector 113 that is connected to the device 300 via a cable 340 of the device 300. As shown in a plan view of the desktop 104, the desktop 104 can be defined by an area within an x,y-plane where the area includes a footprint of the display device 110, a footprint of a computing device 210, optionally a footprint of a peripheral device 234 (e.g., a mouse, a joystick, a trackball, etc.) and at least a portion of a footprint of the device 300. In the example of FIG. 2A, the device 300 can include a sensor with a FOV that is suitable for detecting the presence of the user 201 as standing. For example, the FOV can be substantially in front of the display device 110 and extend from approximately the desktop 104 upwards.

Figure 2B:
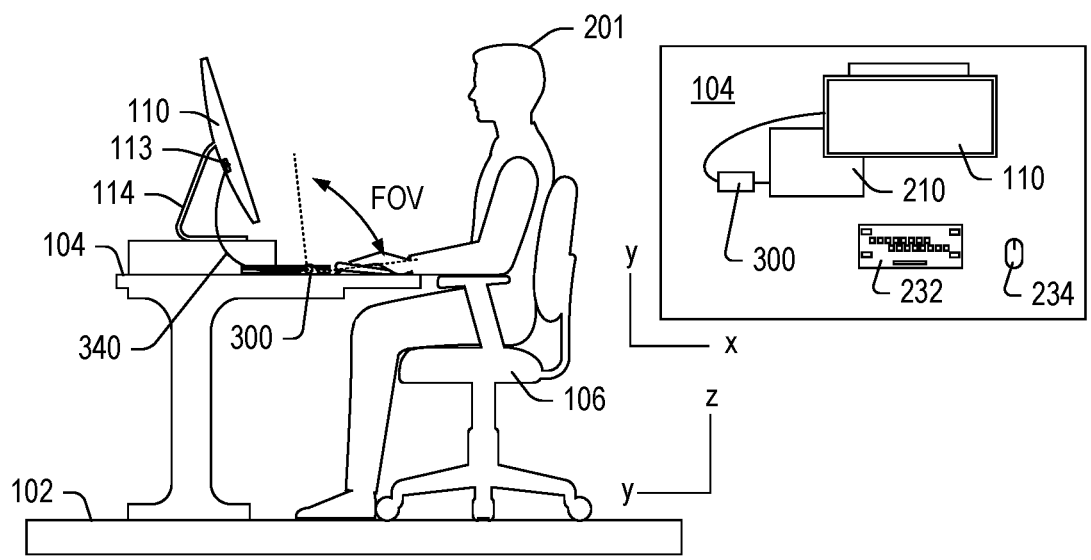

FIG. 2B shows an example of the user 201 seated on the chair 106 before the desktop 104 of a workstation where the display device 110 is supported by the desktop 104 via the stand 114 and where the display device 110 includes the connector 113 that is connected to the device 300 via the cable 340 of the device 300. As shown in a plan view of the desktop 104, the desktop 104 can be defined by an area within an x,y-plane where the area includes the footprint of the display device 110, the footprint of the computing device 210, optionally a footprint of a keyboard device 232 and optionally the footprint of the peripheral device 234 and at least a portion of the footprint of the device 300. In the example of FIG. 2B, the device 300 can include a sensor with a FOV that is suitable for detecting the presence of the user 201 as seated. For example, the FOV can be substantially in front of the display device 110 and extend from approximately the desktop 104 upwards.

Figure 3:
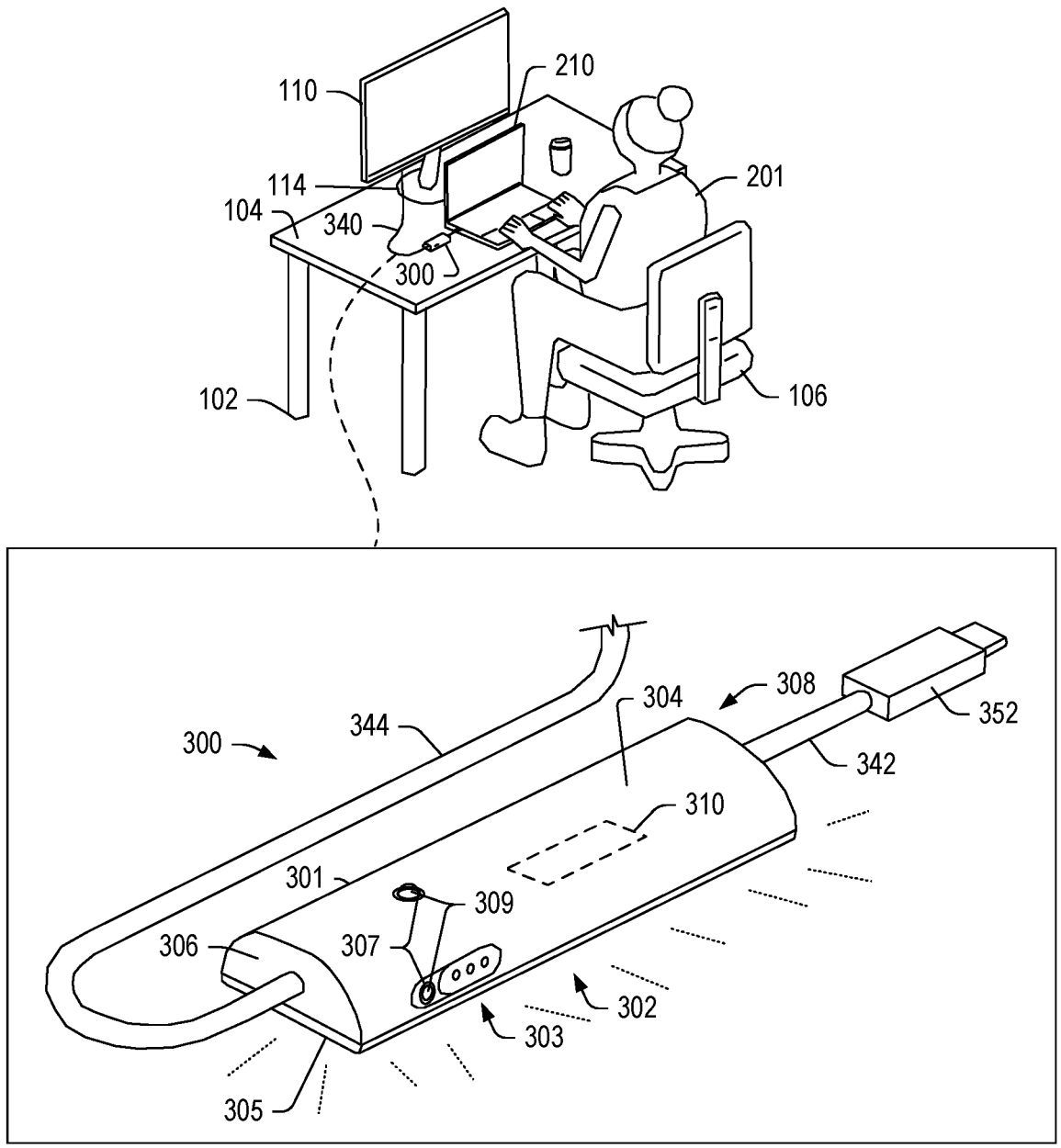
FIG. 3 is a perspective view of an example of a device that includes a cable at a workstation.

FIG. 3 shows an example of the device 300 in an example scenario where the user 201 is seated in a chair 106 at a workstation supported on the floor 102 with a desktop 104 supporting a display device 110 on a stand 114 where the user's computing device 210 is connected to the display device 110 via the device 300. As shown, in the example, of FIG. 3, the device 300 includes a housing 301 and the cable 340 where the cable 340 includes two portions 342 and 344. As shown, the device 300 can include a base 302, an upper surface 304 and opposing sides 306 and 308. The device 300 can include circuitry 310 that can be operatively coupled to one or more conductors of the cable 340. As an example, the upper surface 304 may include a planar portion, which may be a platform. For example, consider a planar portion that may be suitable for positioning of a smartphone where the planar portion with a smartphone supported thereon does not interfere with a FOV of a human presence sensor of the device 300. In such an example, the device may include charging circuitry (e.g., Qi standard, etc.) for wireless charging of the smartphone. In the example of FIG. 3, a portion of the upper surface 304 such as above the dashed block labeled with respect to the circuitry 310 may be recessed such that a smartphone can be positioned thereon where the circuitry 310 may include wireless charging circuitry and where a thickness of the smartphone may not rise above a peak of the upper surface 304 such that a human presence sensor can be provided with an acceptable FOV.

As shown in the example of FIG. 3, the cable portion 342 can extend from the housing 301 to a connector 352 that can connect to the computing device 210 and the cable portion 344 can extend from the housing 301 to the display device 110, which may also include one or more types of connectors suitable for electrically connecting to the connector 352 such that the display device 110 can electrically connect to the computing device 210.

In the example of FIG. 3, the device 300 can include one or more indicators 303, which can include one or more LED indicators. In the example of FIG. 3, the device 300 can include an illuminated portion 305, which may be an illuminated base portion (see, e.g., dotted lines that represent illumination). For example, consider utilization of one or more waveguides, etc., that can transmit light emitted by an LED or LEDs that may indicate a status or statuses. As an example, consider a green light that may indicate that the workstation is available for use. As an example, consider a low intensity red light that may indicate that the workstation is in use or otherwise unavailable. As an example, where a user checks into a workspace, the device 300 may emit a blinking light that helps to guide the user to the workstation or, for example, multiple workstations may emit blinking light to indicate their availability for the particular user. As an example, where a user chooses a particular workstation, once at that workstation, which can be determined by the device 300, the device 300 can adjust one or more of its indicators (e.g., one or more of the indicators 303 and/or the illuminated portion 305).

As shown in the example of FIG. 3, the device 300 can include one or more apertures 307, each of which can be for a lens or lenses 309, etc., such that a human presence sensor of the device 300 can acquire sensor data that can be indicative of human presence or absence of human presence at a workstation. As an example, the device 300 may include one or more apertures as the device 300 may include one or more human presence sensors, which may be referred to as human presence detection sensors (e.g., HPD sensors). For example, consider one or more apertures that can provide for HPD in a more comprehensive manner. For example, consider hemispheric coverage via one or more HPD sensors that can sense in approximately 360 degrees. In such an example, a HPD sensor may sense from one of the sides 306 and 308, a corner between one of the sides 306 and 308 and the upper surface 304, etc. While the housing 301 is shown in the example of FIG. 3 substantially as a portion of a cylinder (e.g., a semicylinder, etc.), the housing 301 may have one or more other shapes (e.g., a hemisphere, etc.; see also, e.g., FIG. 12 and FIG. 13).

In the example of FIG. 3, the device 300 can be asymmetric in that it can be placed on the desktop 104 with the base 302 down and in contact with the desktop 104. For example, the upper surface 304 may be shaped in a manner that makes it unsuitable to support the device 300 with stability on the desktop 104. For example, the curved upper surface 304 shown in the example of FIG. 3 may rock responsive to movement of the computing device 210, the display device 110, the desktop 104, etc., which may confound robust HPD by the device 300 (e.g., consider a moving FOV, etc.).

As explained, the housing 301 may have a semicylinder shape that provides for the rounded upper surface 304 and the flat base 302, along with the substantially flat sides 306 and 308, where the cable portion 344 can extend from the side 306 to the display device 110 and where the cable portion 342 can extend from the side 308 to the computing device 210. In such an example, the upper surface 304 can include an apex where, for example, one or more sensors may be positioned. For example, one of the one or more apertures 307 may be at the apex such that one of the one or more lenses 309 can be aligned therewith for a wide FOV, for example, consider a fisheye type of lens. A fisheye lens is a type of ultra wide-angle lens that can create a wide panoramic or hemispherical image given its ultra wide-angle FOV. Where a lens extends beyond the upper surface 304, the rounded shape may help to avoid contact with the lens as a user may be unlikely to position the housing 301 with the upper surface 304 on the desktop 104 given that the base 302 is substantially flat and more suitable for contact with the desktop 104.

In the example of FIG. 3, the cable portion 342 may be of a lesser length than the cable portion 344. In such an example, a distance between the housing 301 and the computing device 210 may relatively predetermined. As shown, where the user 201 utilizes the computing device 210 for typing, the length of the cable portion 342 can place the housing 301 in a position relative to the user 201 that can be optimal for HPD. For example, the cable portion 342 may be of a length that is less than approximately 30 cm to reduce risk of poor placement of the housing 301 and its one or more HPD sensors. For example, where the cable portion 342 is less than approximately 30 cm, one or more of the one or more lenses 309 can be suitable for HPD sensing of a user at a workstation.

Referring to FIG. 2B, the computing device 210 is shown to be in a closed position such as a closed clamshell orientation. A computing device may be a laptop computing device, which is a clamshell type of computing device with a clamshell form factor. A laptop computing device, or laptop, may have a thickness of approximately 2.5 cm or less where, generally, a display housing is thinner than a keyboard housing. As an example, a device such as the device 300 can include a height that is equal to or greater than approximately 2.5 cm. In such an example, a sensor of the device 300 may be able to view of user without substantial obstruction from a laptop computing device in a closed clamshell orientation. As an example, a device can include one or more sensors that can be mounted at a height, as measured from a base of the device, that is equal to or greater than approximately 2.5 cm. For example, consider the one of the one or more lenses 309 as mounted at or proximate to an apex of the rounded upper surface 304.

As shown in the example of FIG. 3, the device 300 is positioned to the left of the user 201. About 90 percent of people are right-handed with the remaining 10 percent either left-handed or some degree of ambidextrous. Given the larger percentage of right-handedness, a user is more likely to position a mouse on the right side of a computing device. In an effort to keep the right side clear, various computing devices have one or more ports on the left side. For example, if a cable is connected to a right side port of a computing device, with the keyboard in front of a user, space to the right side of the computing device may be diminished for utilization of a mouse.

In the example of FIG. 3, the connector 352 may be a connector that is limited in its orientation with respect to a port. For example, the connector 352 can have a top side and a bottom side where the top side is to be oriented facing upward. An example of an oriented port can be a USB type-A port. According to the USB 2.0 specification, a USB 2.0 type-A connector is to be embossed with a USB icon to provide easy user recognition and facilitate alignment during a mating process. In various instances, a USB type-A male connector can have a seam where the seam is to be facing downward for proper mating with a corresponding female USB port. In the example of FIG. 3, where the connector 352 is a USB type-A male connector, the seam, if present, would be facing downward. As an example, the connector 352 may be a USB-C type of connector (e.g., USB-C), which can be mated to a port in one of two orientations. As an example, a connector can be a USB type-A, type-B, micro-B, Mini-B, or type-C connector. As an example, a connector may be a lightning connector, a HDMI connector, a DisplayPort connector, or other type of connector. As an example, while a connector may be a multi-orientation connector (e.g., USB-C), the shape of a housing of a device may help dictate a particular orientation that can make HPD sensing by the device more robust.

As an example, a device can include multiple HPD sensors where, for example, one can be utilized for HPD sensing when a connector of the device is plugged into a left side of a computing device and where another one can be utilized for HPD sensing when a connector of the device is plugged into a right side of a computing device.

Figure 4:
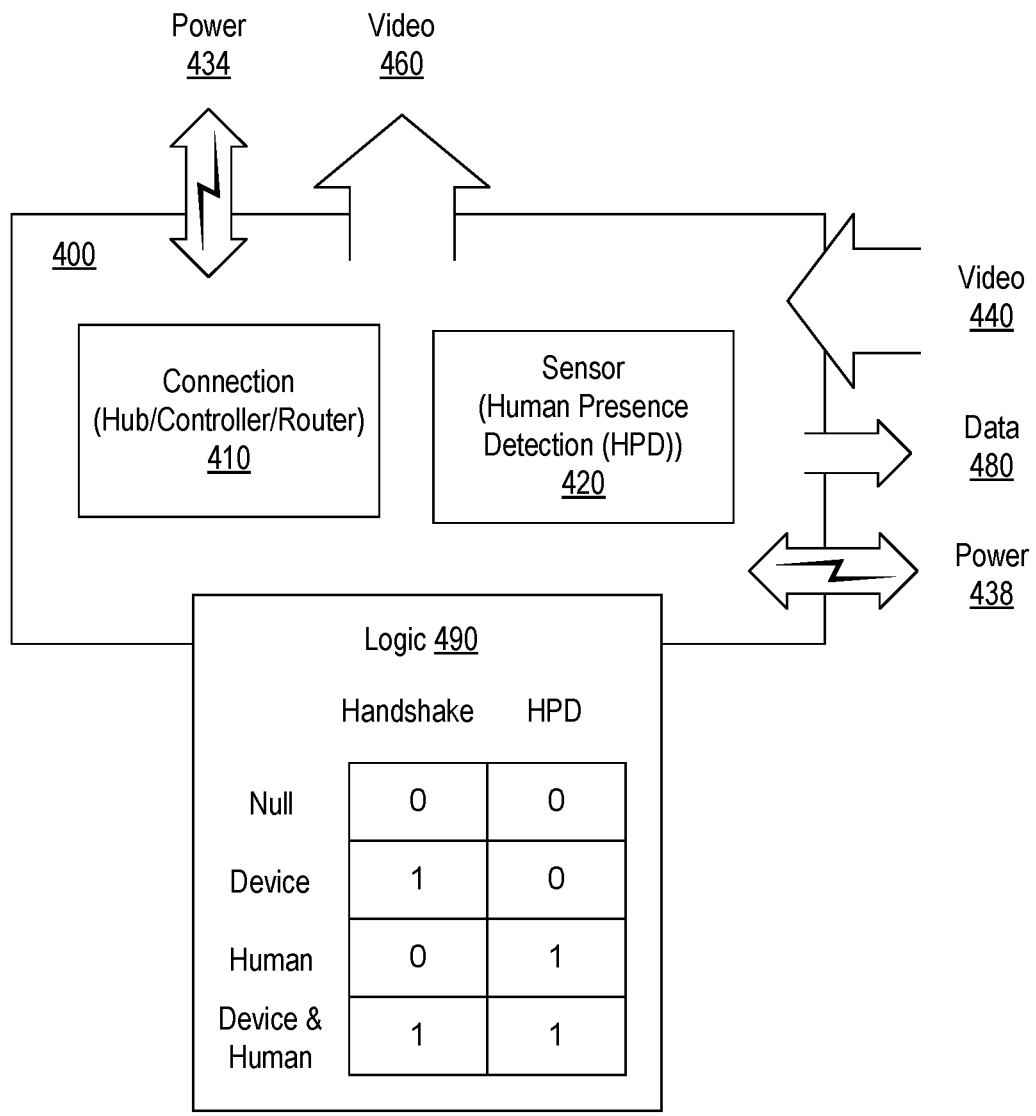
FIG. 4 is a block diagram of example features of a device.

FIG. 4 shows a block diagram of an example of a device 400. As an example, the device 300 can include one or more features of the device 400. As shown, the device 400 can include circuitry 410 and a sensor 420 where the circuitry 410 can be or include, for example, one or more of hub circuitry, controller circuitry and router circuitry and where the sensor 420 can be a human presence detector (HPD) sensor. For example, consider a HPD sensor that includes a lens that has a FOV via the aperture 307 of the device 300 of FIG. 3.

As shown in the example of FIG. 4, the device 400 can receive power via one or more interfaces 434 and 438 and can receive and transmit video data via one or more interfaces 440 and 460. In the example of FIG. 4, the device 400 may include one or more data interfaces 480. As an example, an interface may be a standard type of interface (e.g., USB, HDMI, etc.). As an example, an interface may be a combination interface that can receive and/or transmit data and power where such data can include video data. In the example of FIG. 4, the interfaces 438, 440 and 480 may be electronically coupled to one portion of a cable and the interfaces 434 and 460 may be electronically coupled to another portion of a cable. For example, the device 400 can include a cable where the circuitry 410 and the sensor 420 are in-line with the cable such that they can receive power and/or receive and/or transmit data using at least a portion of the cable.

In the example of FIG. 4, the device 400 can include logic 490, which may be in the form of circuitry (e.g., logic gates, programmed logic, etc.). As shown, the 490 can include a logic data structure that includes connection status and HPD status, which may be provided as binary data (e.g., 0 and 1, etc.). As shown, the logic 490 can include four states that are determined based on the connection status and/or the HPD status where the four states include a null state (e.g., no connection and no human presence), a device state (e.g., a connection and no human presence), a human state (e.g., no connection and human presence), and a device and human state (e.g., a connection and human presence).

As an example, the logic 490 can be determined using the circuitry 410 and the sensor 420. While various examples of binary states are shown, the device 400 may include a timer that can record and/or timestamp a state or states. In such an example, the device 400 can include memory where one or more timed states may be stored to the memory, which can be accessed at a desired time. For example, at the end of a day, a device may be connected to the device 400 (e.g., via wire and/or wirelessly) to access the memory, for example, via the data interface 480. As to a wired approach, consider utilizing one or more conductors of a cable that can be electronically coupled to circuitry of the device 400 for transmission of information stored in memory of the device 400. As to a wireless approach, the device 400 can include one or more wireless interfaces that can transmit information stored in memory. As an example, one or more interfaces may provide for real-time transmission of information such as, for example, state information as, for example, indicated by the logic 490.

As an example, a workstation with a display device can be in a workspace where information generated by a device such as the device 400 can be transmitted from the device to a base device to determine utilization and/or availability of the workstation. In such an example, the base device may receive information from a plurality of devices such that management of multiple workstations can be accomplished (e.g., as to utilization, availability, etc.).

Figure 5A:
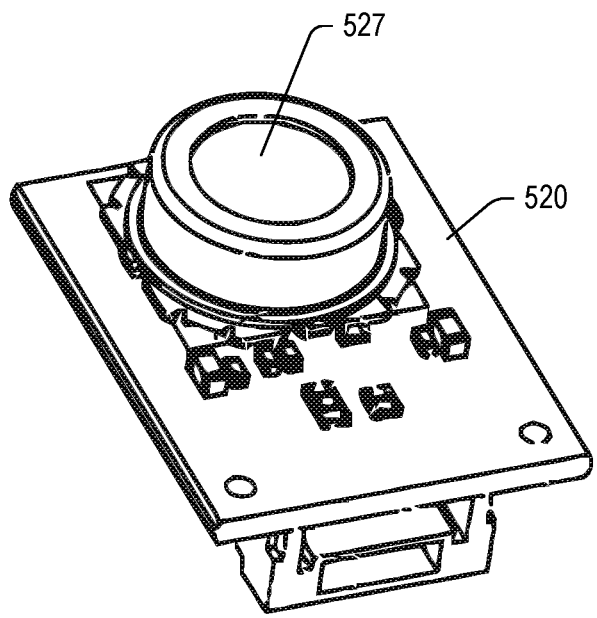
FIG. 5A and FIG. 5B are views of an example of a human presence detection sensor.
Figure 5B:
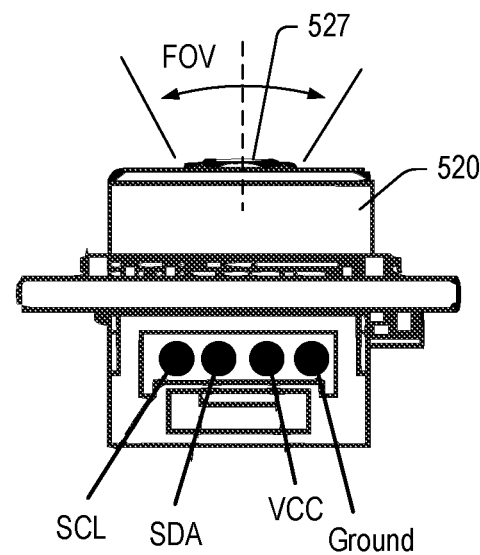

FIG. 5A and FIG. 5B show views of an example of a sensor 520 that can provide for human presence detection (e.g., a human presence sensor that can generate a signal indicative of human presence). For example, the sensor 420 of the device 400 of FIG. 4 may be the sensor 520 or another type of sensor. As an example, the device 400 may include multiple sensors where at least one of the sensors may be the sensor 520.

In the example of FIG. 5A and FIG. 5B, the sensor 520 can include one or more features of the D6T MEMS thermal sensor (OMRON Corporation). While both a pyroelectric sensor and a non-contact MEMS thermal sensor can detect even the slightest amount of radiant energy from an object such as infrared radiation and convert that energy into a temperature reading, the pyroelectric sensor relies on motion detection whereas the non-contact MEMS thermal sensor is able to detect the presence of a stationary human. As an example, a MEMS thermal (IR sensor) can measure the surface temperature of an object without touching the object when its thermopile element absorbs an amount of radiant energy from the object (e.g., a human). As to size, the sensor 520 can include a circuit board size that is, for example, less than approximately 20 mm×approximately 20 mm (e.g., 14 mm×18 mm, 11.6 mm×12 mm, etc.).

In FIG. 5B, a FOV is shown that corresponds to a silicon lens 527 that focuses radiant heat (far-infrared rays) emitted from an object onto a thermopile component. The thermopile component generates electromotive force in accordance with the radiant energy (far-infrared rays) focused on it. The values of this electromotive force and the internal thermal sensor are measured such that the measured value (temperature of the object) can be determined via an interpolation calculation that compares the measured values with an internally stored lookup table. As an example, the measured value can be output, for example, via an I$^2$C interface (e.g., read using a host, etc.).

As to the lens 527, it may be made of a specialized silicon material. As an example, a suitable materials may be characterized as having a relatively high transmission for thermal energy (e.g., greater than approximately 50 percent, etc.) and may include protective or anti-refection coatings, for example, designed for a range of micron wavelength light, etc. As an example, consider a germanium (Ge) material designed to operate in an infrared portion of an EM spectrum (e.g., wavelength of approximately 1 to approximately 23 microns). As to some other examples, consider zinc selenide (ZnSe), float zone silicon, calcium fluoride, sapphire, specialized IR transmitting polymer, barium fluoride, etc. Such materials may span a range of wavelengths from approximately 0.1 microns to approximately 25 microns. Float zone silicon can be a particularly pure silicon material that may be produced via a process such as vertical zone melting. As an example, a material may be provided as a window and/or as a lens. For example, the D6T MEMS thermal sensor can include a specialized, high-performance silicon lens to focus infrared (IR) rays onto one or more thermopiles.

As an example, a lens such as the lens 527 may be aligned with an aperture such as one of the one or more apertures 307 of the device 300 of FIG. 3. As an example, one or more of the one or more lenses 309 of the device 300 of FIG. 3 can be a lens such as the lens 527. As an example, where the device 300 is at a workstation, it can have a sensor FOV that covers a region where a user may be present before the display device 110.

In FIG. 5B, the sensor 520 is shown as including a supply voltage contact, a ground contact and interface contacts labeled SCL (clock) and SDA (data). As an example, a device can include one or more USB-to-I$^2$C adapters. For example, the SCL and SDA contacts may be operatively coupled to USB contacts such that a USB interface may provide for control of and/or receipt of values from the sensor 520.

As an example, the SCL and SDA contacts may provide for data transfer being initiated with a start condition (S) signaled by SDA being pulled low while SCL stays high, followed by SCL being pulled low where SDA sets the first data bit level while keeping SCL low. In such an example, data can be sampled (received) when SCL rises for the first bit (B1) where, for a bit to be valid, SDA does not change between a rising edge of SCL and the subsequent falling edge. Such a process can be repeated with SDA transitioning while SCL is low, and the data being read while SCL is high (B2, . . . , Bn). A final bit can be followed by a clock pulse, during which SDA is pulled low in preparation for the stop bit. A stop condition (P) can be signaled when SCL rises, followed by SDA rising.

As an example, a sensor unit may include one or more sensors, which can include one or more thermal sensors and/or one or more other HPD sensors. As an example, a sensor unit can be or include an environmental sensor unit such as the 2JCIE-BU environment sensor unit (OMRON Corporation), which is a serial bus sensor unit (e.g., USB) that can output temperature (e.g., −10 deg C. to +60 deg C.), humidity (e.g., 30% RH to 85% RH), light (e.g., 10 lx to 2000 lx), barometric pressure (e.g., 700 hPa to 1100 hPa), sound noise (e.g., 37 dB to 89 dB), 3-axis acceleration, equivalent total volatile organic compounds (eTVOC), a discomfort index, a heat stroke warning level, vibration information (e.g., number of earthquakes, number of vibrations, spectral intensity value, etc.). Such a sensor unit can provide for determination of earthquakes based on vibrational acceleration and can provide for monitoring of room air quality (e.g., using a VOC sensor). The aforementioned sensor unit includes BLUETOOTH interface circuitry and USB interface circuitry.

As an example, a device can include a housing with a port that can receive a connector where the connector can be a connector of a sensor unit. For example, consider the 2JCIE-BU environment sensor unit, which includes a male connector (e.g., USB type of connector). In such an example, a device can be optionally augmented with one or more additional sensors. As an example, the device 300 may include a port that may be a female port on one of the sides 306 or 308 or on the surface 304 where an environmental sensor unit can be plugged into the port to operatively couple circuitry of the environmental sensor unit and circuitry of the device 300.

As an example, a cable device can include multiple sensors. In such an example, the multiple sensors may be utilized for one or more purposes. For example, if a user is a heavy typer, the user may make noise that could distract others in a shared workspace. In such an example, the sound noise sensor and/or vibration sensor (e.g., accelerometer) may generate signals (e.g., data, etc.) that can cause a device to issue a notification, which may be in the form of video data to be rendered to a display device. For example, consider a notification (e.g., please type more quietly). Additionally and/or alternatively, typing noise and/or vibrations may be utilized as for purposes of confirming human presence. For example, if a thermal sensor FOV becomes obstructed, a device may assess sound noise sensor data and/or vibration sensor data to make a determination as to whether a human is present. As an example, where a computing device of a user is receiving information from a keyboard device (e.g., integral or external), the computing device may transmit video data such as during use of a word processing application that results in rendering of characters to a display device during typing. In such an example, a device may note video data transmissions, which may be linked with (e.g., synchronous with) sound noise sensor data and/or vibration sensor data. In such an example, the device may be robust in its ability to detect and/or confirm (or deny) human presence. For example, if a person is passing by a workstation without using the workstation, a HPD may indicate presence of a human while one or more other types of data indicate that human activity is not occurring at the workstation (e.g., that a display device at the workstation is not being utilized, etc.).

As an example, where one or more environmental sensors are included in a device, the device may generate video data that can be transmitted to a display device via a cable for rendering. For example, consider a report on temperature, humidity, volatile organics, particles, etc.

As an example, where a workspace becomes crowded, the environment may become more filled with various components. As an example, an environmental sensor may include a carbon dioxide sensor, an oxygen sensor, a particulate matter sensor, etc. As an example, where carbon dioxide increases, oxygen decrease and/or particulate matter increases, that may indicate a drop in air quality. In such an example, a user may decide to leave the workstation and the workspace and/or otherwise notify a workspace manager; noting that the device may include circuitry to automatically notify a workspace manager (e.g., via a wireless interface, etc.).

As an example, a workspace may include a plurality of devices where the workspace can monitor and/or control the workspace. As an example, a system may provide for monitoring workstations individually via individual devices at each of the workstations. Such monitoring can include usage monitoring and environmental monitoring. As an example, if a user complains about the environment at a workstation (e.g., or a neighboring workstation), a manager may be able to confirm whether or not a problem or problems existed. For example, a manger may access a computing device that can receive data and/or reports derived from data. In such an example, the manager may confirm that temperature and humidity were high such that comfort was compromised while a neighboring workstation user was typing loudly in a manner that caused noise and/or vibration. In such an example, a manager may be able to discount a bill or invoice for the user that complained, or otherwise provide credit or some other benefit. If the user would like a different workstation, the manager may be able to search for a set of conditions throughout available workstations that are likely to please the user such that the user can be assigned to another workstation. For example, the manager may view a GUI of a workspace that can render noise levels, vibration levels, comfort index, light intensity, etc., and then select a workstation within the workspace that is likely to meet the user's desired conditions. In such an example, a user profile may be stored such that upon a subsequent visit, the user can be recommended a particular available workstation.

As an example, a system for managing a workspace that includes workstations can include a device that includes a cable and a HPD where the device may include one or more environmental sensors. In such an example, user experience may be enhanced, particularly for users that desire particular conditions (e.g., noise, vibration, light intensity, air flow, temperature, humidity, etc.).

Figure 6:
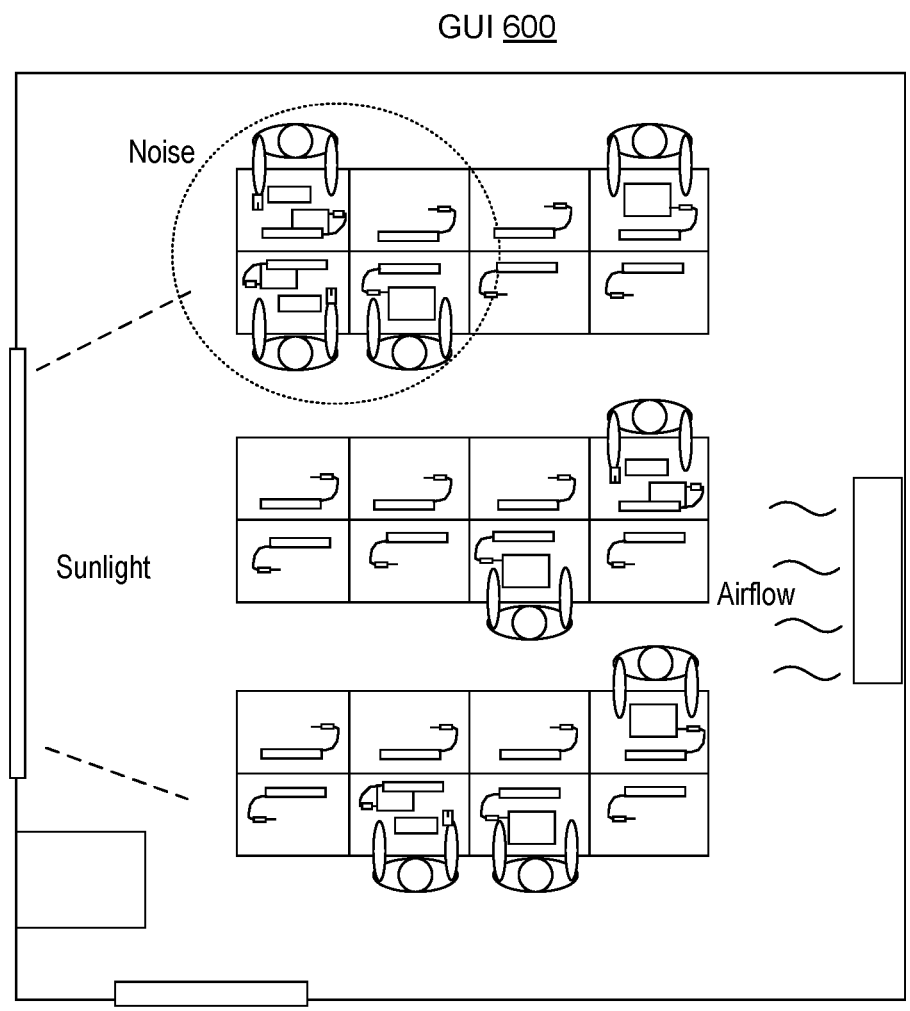
FIG. 6 is a diagram of an example of a graphical user interface.

FIG. 6 shows an example of a graphical user interface (GUI) 600 that includes a diagram of a workspace with 24 workstations. In the example of FIG. 6, the diagram may or may not include various features of the workspace such as, for example, windows, doors, concierge station, HVAC equipment (e.g., heating, air conditioning, filtration, etc.). In such an example, the GUI 600 may be for an app such as a mobile device application and/or for a management device. In the example of FIG. 6, the GUI 600 shows indicators for noise, sunlight and airflow, which can be environmental conditions, along with indicators of users at 9 of the 24 workstations. As an example, where devices such as the device 300, the device 400, etc., are included at each of the workstations or at least some of the workstations, one or more of various conditions can be monitored, which can include HPD and optionally one or more environmental conditions. In such an example, a user may select a workstation that is not occupied and that may have one or more conditions desired by the user. In such an example, the one or more conditions can include human presence (e.g., is a neighboring workstation occupied) and/or one or more environmental conditions (e.g., is the workstation in a sunny location, a noisy location, a breezy location, a hot location, a cold location, a poor air quality location, etc.).

As an example, a system can include a base station that can receive information from one or more devices that can be distributed in a workspace at workstations. In such an example, the base station may include wired and/or wireless communication circuitry to receive information from the devices. For example, consider a WiFi and/or BLUETOOTH enabled base station that can receive information from WiFi and/or BLUETOOTH enabled devices. As mentioned, a device may include one or more ports that can provide for extensibility. For example, consider one or more of wireless communication extensibility, environmental sensor extensibility, HPD sensor extensibility, etc.

Figure 7:
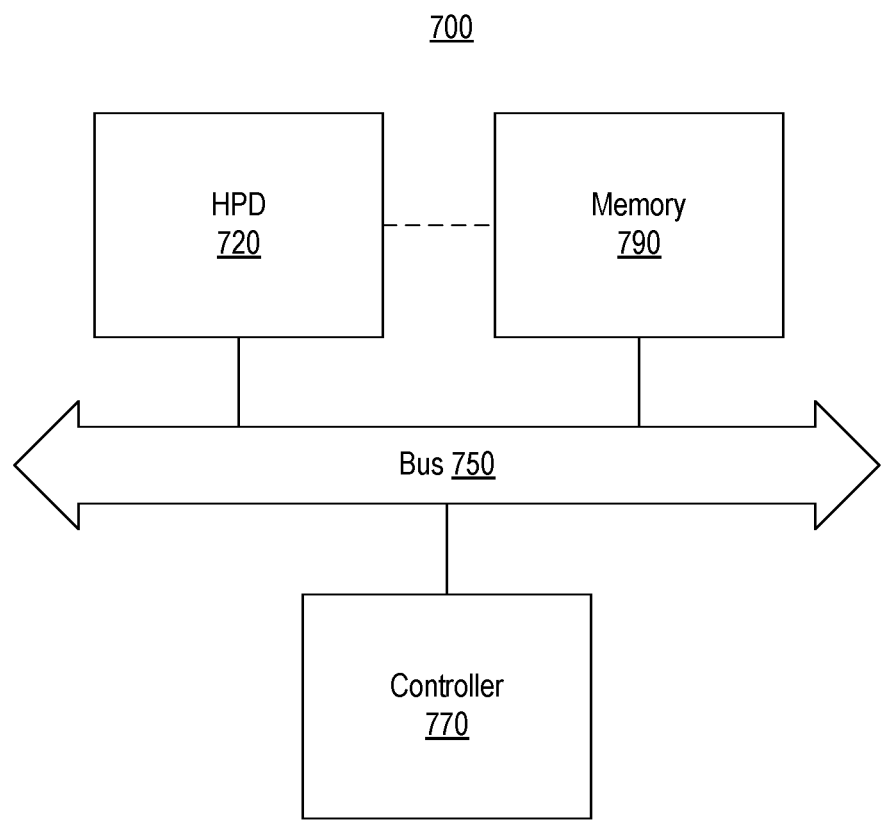
FIG. 7 is a block diagram of an example of a device architecture.

FIG. 7 shows a block diagram of an example of a component architecture 700 of a device where the components can include a HPD component 720, a bus 750, a controller 770 and memory 790. As shown, the controller 770 can be operatively coupled to the HPD component 720 and the memory 790 via the bus 750. As an example, the bus 750 may be a serial bus such as, for example, a USB or other type of serial bus. As an example, the controller 770 may include logic that can utilize information from the HPD component 720. For example, consider if-then logic that may respond to receipt of information from the HPD component 720 and may control what type of information is to be stored and/or retrieved from the memory 790, optionally for transmission via the bus 750. As mentioned, a bus can be a video data bus. In such an example, the controller 770 may access information stored in the memory 790 responsive to information received from the HPD component 720 to transmit information for rendering to a display device. In such an example, the display device may render one or more notification, which may be suitable for viewing by a user. For example, consider a notification "this workstation is occupied" or "this workstation is available" or "your time has expired" or "your time will expire in 15 minutes" or "workspace closing in 15 minutes" or "temperature is 20 deg C.", etc.

FIG. 8 shows an example of a USB-C receptacle 804, a USB-C plug 808, display configurations 810, which include USB and DisplayPort (DP) 812 and DP 814, and a data diagram 820, which may be for an I²C type of interface that may be interoperative using a USB interface.

USB-C allows for connection to an external display device through a USB port. As an example, USB-C conversion to DisplayPort (DP) or to HDMI may be utilized. As an example, a USB-C hub can provide external display device support.

In various instances, DP video can be carried more efficiently on USB-C than HDMI for the same resolution and refresh rate. FIG. 8 shows features of the 24 pin USB-C connector where four differential pairs called "lanes" can carry high speed data; noting that a fifth differential pair D+ and D− can carry slower USB 2.0 data. As illustrated, DP video can be provided using USB-C. For DP Alternate Mode (see USB & DP 812), a USB-C connector can function like a DP connector with a different shape and some extra wires for USB data (e.g., without loss of USB 3.1 performance). To a computing device and an external display device, this can look like a regular DP connection. Two lanes can provide for DP bandwidth for one external display device at up to 4K 30 Hz; noting that to keep a 60 Hz refresh rate, there can be a step down to 2K or lower resolution.

For 4K 60 Hz, 5K, or multiple external display device, DP Alternate Mode (see DP 814) can be utilized with four lanes for DP data. To the computer and the external monitor, this still looks exactly like a regular DisplayPort connection. In such a mode, there are no lanes remaining for USB 3.1 data; however, there is the D+/D− pair, which can provide for slower USB 2.0 data. In such an example, a USB-C hub using the DP 814 approach (e.g., for 4K60 video) may not support a USB 3.1 port.

As shown in the example data diagram 820 of FIG. 8, the D+/D− pair may be utilized with a HPD sensor. For example, the sensor 520 of FIG. 5A and FIG. 5B may be utilized with a USB-C and DP 814 approach. As an example, a controller may be operatively coupled to a USB-C bus where D+/D− can provide for receipt of HPD sensor data and/or other sensor data.

As an example, where a USB-C port has Thunderbolt 3 capability, then DP data can be encapsulated within the Thunderbolt data stream. In such an example, video data becomes a type of packetized data multiplexed with any other data. Thunderbolt 3 has enough bandwidth to support multiple 4K60 video connections, with enough bandwidth remaining for USB 3.1 data. As an example, a device can include a cable that can carry data using the Thunderbolt 3 specification.

Figure 9:
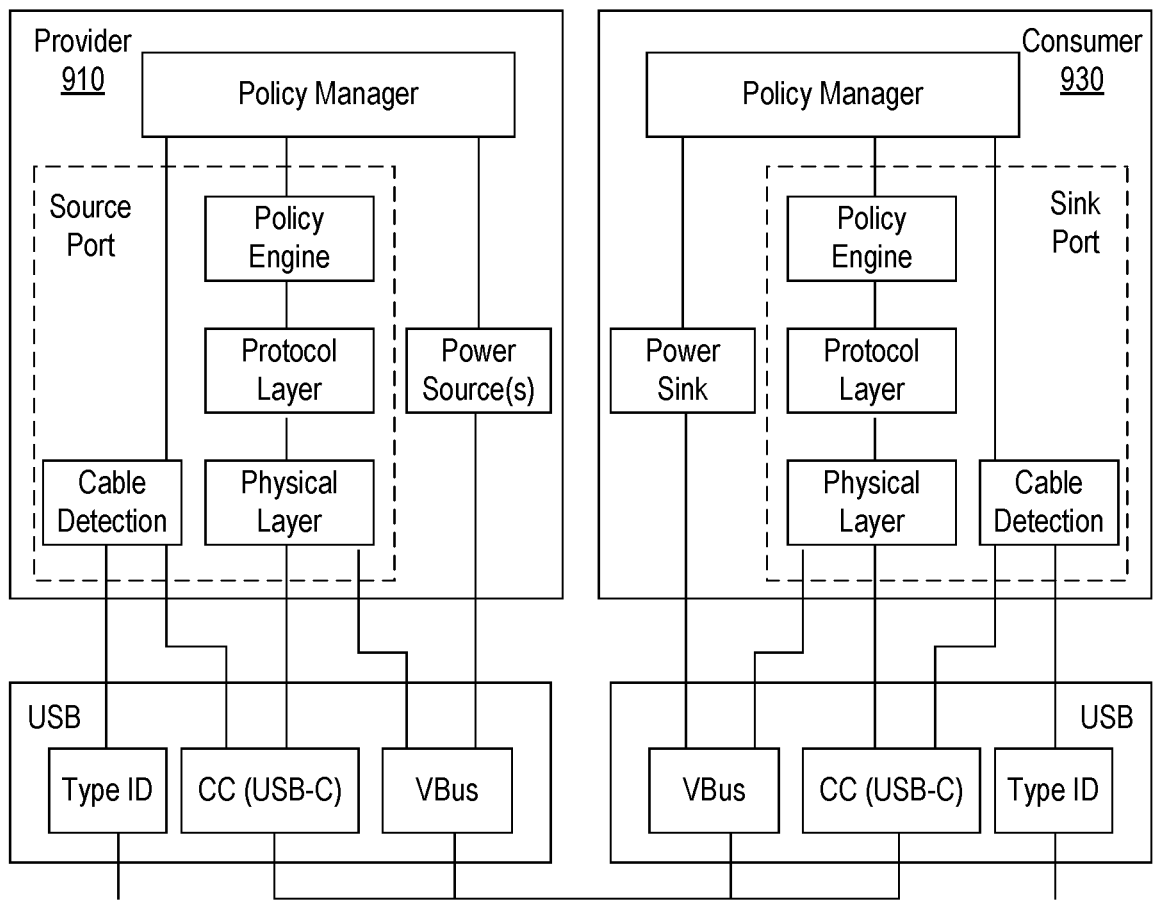
FIG. 9 is a block diagram of an example of a system architecture.

FIG. 9 shows an example of an architecture 900 that includes a provider 910 and a consumer 930, each with corresponding serial bus connections that interconnect the provider 910 and the consumer 930. In such an example, the provider 910 includes a source port and the consumer 930 includes a sink port, each with cable detection circuitry. In such an example, cable detection can be provided at the provider 910 and/or at the consumer 930.

As an example, a device can include one or more instances of provider and/or consumer circuitry. In such an example, the device can include cable detection circuitry that can generate a signal upon connection and/or disconnection. As explained, a device may include logic that can utilize connection information and HPD information.

Figure 10:
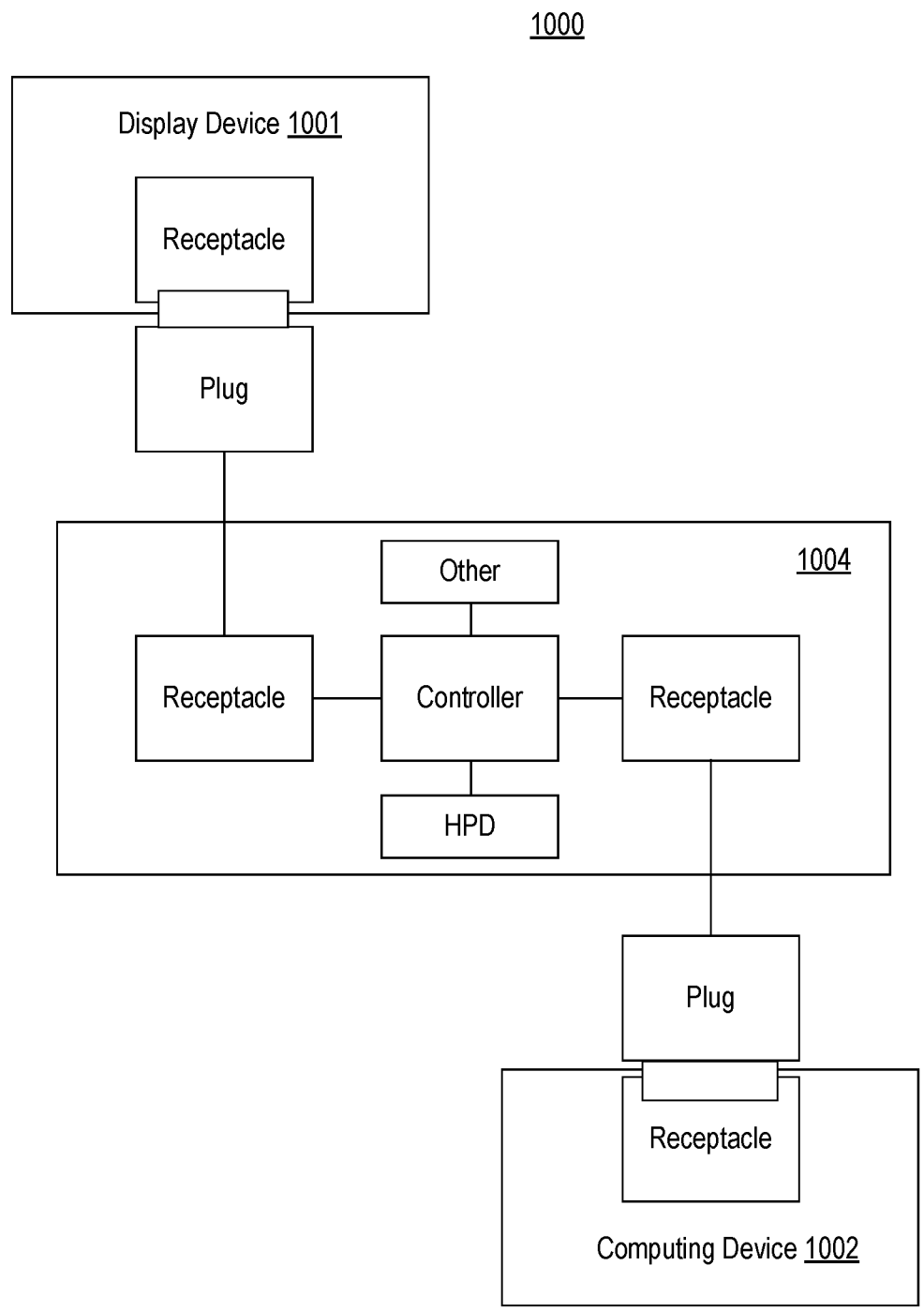
FIG. 10 is a block diagram of an example of a system architecture.

FIG. 10 shows an example of architecture 1000 where a displace device 1001 can be operatively coupled to a computing device 1002 via a device 1004. As shown, the device 1004 can include male plugs where one fits a receptacle of the display device 1001 and where another one fits a receptacle of the computing device 1002. In such an example, the device 1004 can include corresponding receptacle for cable ends that may be operatively coupled to a controller and/or a bus that is operatively coupled to the controller. As shown, the device 1004 can include HPD circuitry and other circuitry, both of which can be operatively coupled to the controller.

In the example of FIG. 10, the device 1004 can provide for pass through of video data from the computing device 1002 to the display device 1001 while optionally taking one or more actions with respect to the HPD circuitry and optionally the other circuitry. As an example, the other circuitry may include memory. As an example, the other circuitry may include one or more types of environmental sensors. As explained, the device 1004 may include features that provide for transmission of video data to the display device 1001 for rendering to a display thereof. In such an example, the controller may control transmission of such video data, for example, responsive to information received by the HPD circuitry.

Figure 11:
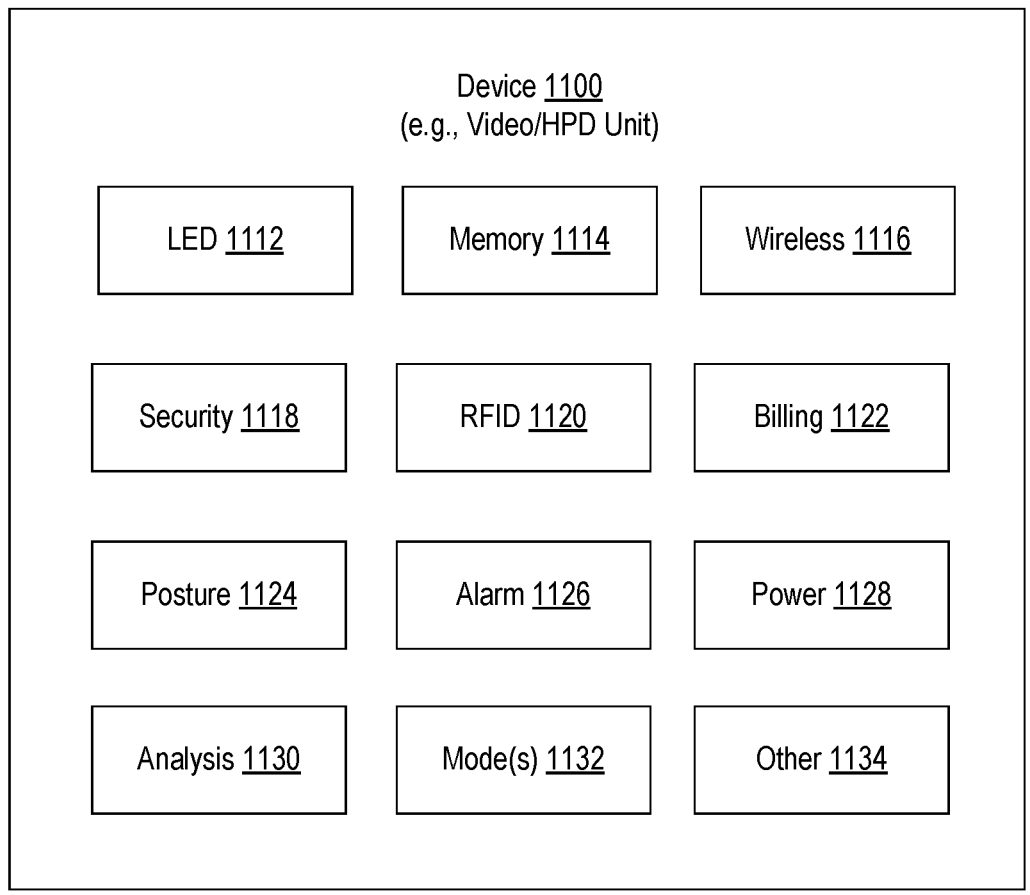
FIG. 11 is a block diagram of example features of a device.

FIG. 11 shows an example of a device 1100 that can be a video and HPD unit. As shown, the device 1100 can include one or more LEDs 1112, memory 1114, wireless circuitry 1116, security circuitry 1118, RFID circuitry 1120, billing circuitry 1122, posture circuitry 1124, alarm circuitry 1126, power circuitry 1128, analysis circuitry 1130, mode circuitry 1132 and one or more other types of circuitry.

As an example, the security circuitry 1118 may demand that a user type in a code for a session to commence for use of a display device at a workstation. For example, the device 1100 can cause a display device to render a message such as "enter code" where up entry of a proper code the device 1100 allows for use of the display device by a computing device.

As an example, as to the RFID circuitry 1120, it may provide for transmission of information and/or identification of a device, for example, via a RFID scanner.

As an example, as to billing circuitry 1122, it may provide for usage time of a workstation according to information sensed by a HPD sensor and/or by connection information detected by circuitry of the device 1100 (e.g., including a signal from a display device, etc.).

As an example, the posture circuitry 1124 may utilize HPD sensor data and/or other data to determine whether a user has proper posture at a workstation. For example, consider a thermal sensor that can determine whether a user is slouching or sitting up straight. In such an example, where the user is slouching, the device 1100 may transmit video data for rendering to a display device to remind the user to adjust his posture.

As an example, the alarm circuitry 1126 may provide an alarm (e.g., silent or loud) responsive to movement and/or distance of the device 1100 from a display device. For example, if a user attempts to disconnect the device 1100 from a display device at a workstation the alarm circuitry 1126 may issue an alarm, which may be to a base station to alert a manager, etc. As an example, the alarm circuitry 1126 may operate as an actual and/or a virtual leash such that an alarm is issued if the device 1100 is greater than a distance from a display device.

As an example, the power circuitry 1128 may manage power of the device 1100, which may power down to a low power state when not in use. As mentioned, where the device 1100 includes wireless charging circuitry and a platform for a smartphone, it may be utilized to charge a smartphone's rechargeable battery. In such an example, the device 1100 may include circuitry conforming to the Qi standard, which utilized electromagnetic induction to transfer energy between coils.

As an example, the analysis circuitry 1130 can provide for one or more types of analyses utilized one or more types of data, timers, etc., which may be generated by the device 1100 and/or by one or more of a display device and a computing device operatively coupled to the device 1100.

As an example, the mode circuitry 1132 may provide for one or more types of display modes. For example, as explained a display may be utilized for a particular resolution, a particular refresh rate, etc., of video data. As an example, the mode circuitry 1132 may account for such different modes optionally in a manner that allows for proper communication of other data such as, for example, HPD sensor data. As explained with respect to the example of FIG. 8, different modes can utilize different capabilities of USB-C technology where, depending on mode, video data may provide for communication of other using one or more pins (e.g., lanes, etc.). For example, consider a mode where video data allows for higher speed transmission of other data and another mode where video data allows for lower speed transmission of other data (e.g., D+/D−).

As an example, the device 1100 can include a fluid chamber that can carry one or more fluids. For example, consider a disinfecting fluid that can be stored in the chamber and emitted by the device 1100. In such an example, the device 1100 may emit disinfecting fluid after a user leaves a workstation, for example, responsive to disconnection of the device 1100 from a computing device and/or lack of human presence per a HPD sensor. In such an example, a timer may be utilized to cause a pump to emit a spray of the fluid via one or more nozzles, etc., to cause droplets of the fluid to travel above and optionally onto at least a portion of a desktop.

Figure 12:
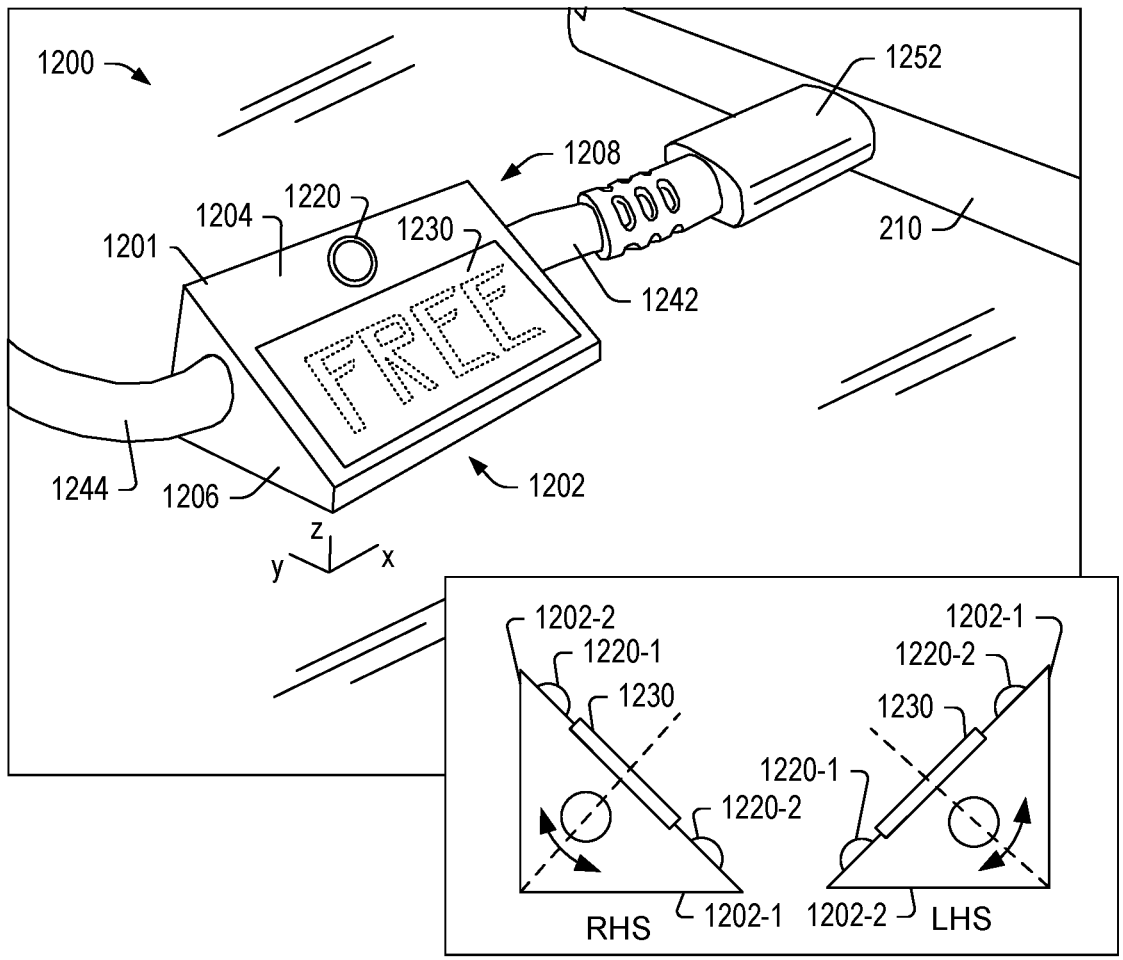
FIG. 12 is a perspective view of an example of a device and an example of a computing device.

FIG. 12 shows an example of the computing device 210 and an example of a device 1200 that includes portions of a video cable 1242 and 1244 that includes opposing ends; and a human presence sensor 1220 operatively coupled to the portions of the video cable 1242 and 1244 between the opposing ends.

In the example of FIG. 12, the device 1200 includes a housing 1201 with a base 1202, an upper surface 1204, and opposing sides 1206 and 1208. In the example of FIG. 12, the device 1200 can include a back surface that joins the upper surface 1204, the base 1202 and the sides 1206 and 1208. As an example, one or more features of the device 1200 may be described with respect to a Cartesian coordinate system x, y and z. In the example of FIG. 12, the device 1200 includes a display 1230, which can be utilized for rendering of information such as, for example, one or more of status, condition(s), etc. In the example of FIG. 12, the device 1200 may render a "FREE" message until detecting of human presence and/or connection to a computing device may occur. For example, the "FREE" message of the display 1230 may be a fading message responsive to one or more of such events where it may be replaced with other information (e.g., status of "OCCUPIED", "See Front Desk", "Logged In", video type (e.g., resolution, aspect ratio, refresh rate, etc.), environmental condition(s), time, timer, etc.).

In the example of FIG. 12, the human presence sensor 1220 can be a human presence detection (HPD) sensor. As an example, the human presence sensor 1220 can include one or more features of the sensor 520 of FIG. 5. As an example, the human presence sensor 1220 can have a FOV that extends above the computing device 210 and toward a region where a torso, a head, an arm, a hand, etc., may be present. In the example of FIG. 12, the video cable portion 1242 may allow for spacing the housing 1201 a distance from the computing device 210, which may help to allow for airflow, etc., of the computing device 210. As an example, a video cable portion may be bendable or may be non-bendable. For example, consider a stiff video cable that extends from the connector 1252 to the housing 1201. In such an example, the positional relationship between the housing 1201 and the computing device 210 may be substantially fixed when the connector 1252 is connected to a port of the computing device 210.

As shown in the example of FIG. 12, the upper surface 1204 is sloped such that the display 1230 may face a user for ease of viewing and such that the human presence sensor 1220 has an appropriate view of a region where a user may be present. As shown, the base 1202 can be planar (e.g., flat). In such an example, a user may be unlikely to orient the housing 1201 in a manner that limits the view of the human presence sensor 1220.

As an example, the display 1230 may be a touch-screen display where a user may touch one or more areas of the display 1230 to register input. For example, one or more graphical user interfaces (GUIs) may be rendered to the display 1230 where a user may interact with the device 1200 using touch.

As shown in the example of FIG. 12, the housing 1201 can include more than one human presence sensor 1220-1 and 1220-2 where, for example, the display 1230 may be positioned between the sensors 1220-1 and 1220-2. In such an example, the housing 1201 may be suitable for use on a right hand side (RHS) or a left hand side (LHS) of a computing device (see, e.g., FIG. 2A) where a side 1202-1 can be a base or where a side 1202-2 can be a base. In such an example, where the connector 1252 can be plugged into the computing device 210 in either of two different orientations (e.g., consider USB-C connector), then the symmetry of the housing 1201 can provide for use on either side where, for example, a sensor, etc., can determine which side is up for purposes of rendering information properly to the display 1230. If the connector 1252 is limited to one orientation (e.g., USB type B, etc.), then the housing 1201 may be rotatable with respect to the cable portions 1242 and 1244 such that it can be properly positioned whether on a RHS or LHS of a computing device. As shown, in the RHS example, the human presence sensor 1220-1 is an upper sensor and the human presence sensor 1220-2 is a lower sensor; whereas, for the LHS example, they are flipped. As an example, circuitry of a device may be utilized to prioritize information from one sensor over another sensor, for example, consider activating or deactivating a sensor based at least in part on orientation.

As an example, a housing of a device can include a symmetry that provides for LHS and RHS orientations, where, for example, if a display is included, circuitry can operate to assure that information is properly rendered to the display for ease of viewing (e.g., reading, etc.) by a user.

As an example, the device 1200 of FIG. 12 can include one or more types of circuitry (see, e.g., circuitry described with respect to FIG. 3, FIG. 4, FIG. 5A, FIG. 5B, FIG. 6, FIG. 7, FIG. 8, FIG. 9, FIG. 10, FIG. 11, etc.).

Figure 13:
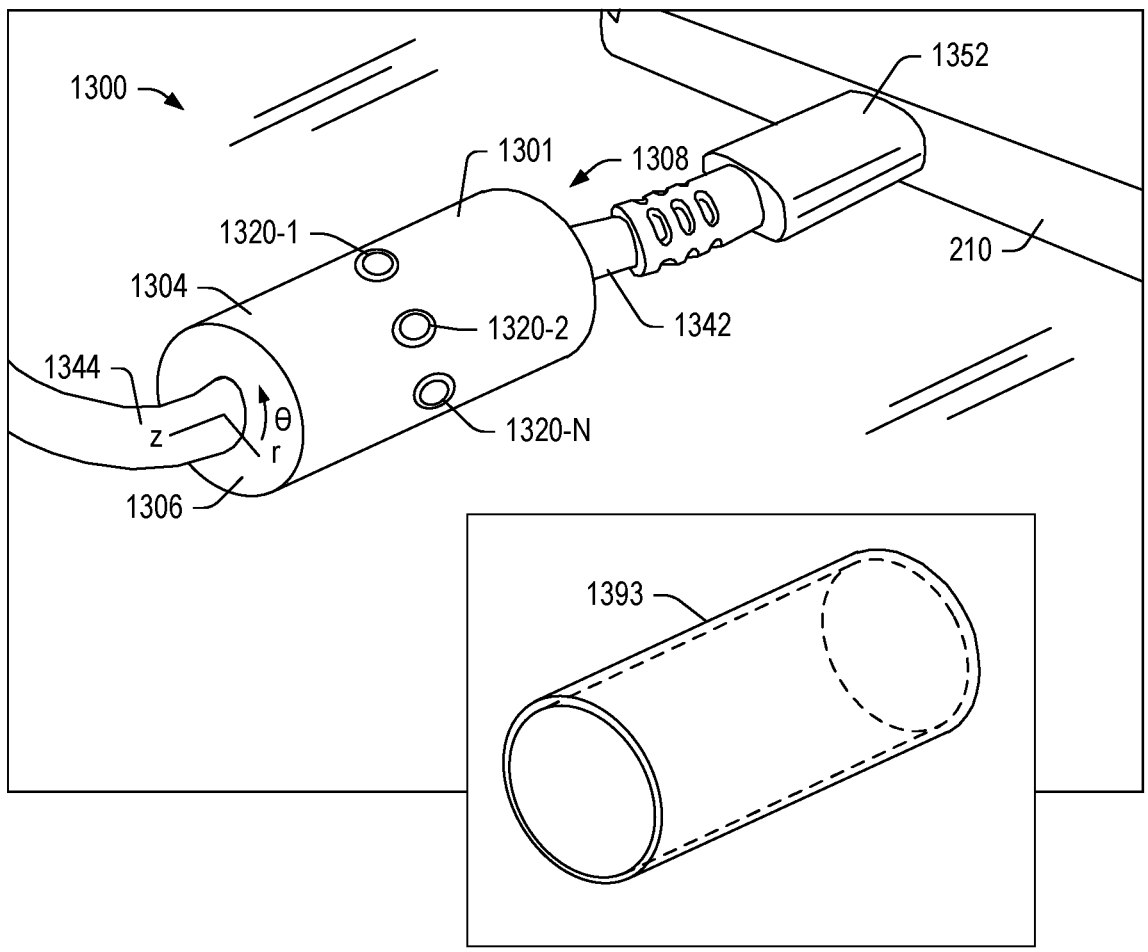
FIG. 13 is a perspective view of an example of a device and an example of a computing device.

FIG. 13 shows an example of the computing device 210 and an example of a device 1300 that includes portions of a video cable 1342 and 1344 that includes opposing ends; and a human presence sensor 1320 operatively coupled to the portions of the video cable 1342 and 1344 between the opposing ends.

In the example of FIG. 13, the device 1300 includes a housing 1301 with a surface 1304 and opposing sides 1306 and 1308. As an example, one or more features of the device 1300 may be described with respect to a cylindrical coordinate system z, r and θ.

As shown in FIG. 13, the housing 1301 of the device 1300 may be cylindrical where one or more human presence sensors 1320-1, 1320-2, . . . , 1320-N are provided that can generate one or more signals for detection of human presence. In such an example, the housing 1301, being shaped as a cylinder, can include human presence sensor apertures that provide for alternative fields of view that can accommodate one of a plurality of orientations of the housing for purposes of human presence detection. In such an example, a device may be more discrete and may or may not include one or more status indicators. For example, a discrete device may include features that do not draw attention. For example, the device 1300 may be provided without lights, a display, etc. As an example, the one or more human presence sensors 1320-1, 1320-2, . . . , 1320-N may covered by a sheath 1393 made of a suitable material such that thermal energy and/or other energy may be sensed without having them readily visible (e.g., consider a sheath made of a specialized silicon material, a germanium material, a specialized polymer, sapphire, a zinc selenide material, etc.). In such an example, the housing 1301 as covered by a sheath 1393 may appear relatively innocuous such as an EMI suppressor where it is in fact an incognito human presence detecting device (e.g., the sheath 1393 may be tinted in a manner where IR radiation can pass where visible radiation is at least in part obscured). As an example, a device may include an EMI suppressor, which may, for example, be part of a human presence sensor housing, disposed within a human presence sensor housing, disposed separate from a human presence sensor housing, etc. As an example, the device 1300 of FIG. 13 may be suitable for use on a right hand side (RHS) or on a left hand side (LHS) of a computing device of a user (see, e.g., FIG. 2A). For example, whether the connector 1352 is a two orientation connector (e.g., USB type C) or a single orientation connector (e.g., USB type B), the device 1300 may be suitably positioned on either a RHS or a LHS of a computing device for purposes of human presence detection and transmission of video data.

As an example, the device 1300 of FIG. 13 can include one or more types of circuitry (see, e.g., circuitry described with respect to FIG. 3, FIG. 4, FIG. 5A, FIG. 5B, FIG. 6, FIG. 7, FIG. 8, FIG. 9, FIG. 10, FIG. 11, FIG. 12, etc.).

As an example, a HPD sensor of a device may acquire thermal information about a region of a user's head and analyze such information as to whether or not a user is wearing a mask. In such an example, if the device is programmed to issue a mask warning, where the device determines that a user at a workstation is not wearing (e.g., or properly wearing) a mask, the device may issue a notification, which may be via one or more indicators (e.g., visual via an LED, a display, etc., audible via a speaker, etc.) and/or via transmission of data to a display device for rendering by a display thereof that is visible to the user.

As an example, a device can include display circuitry and an on-board display for rendering information germane to a workstation. As an example, a device can include log-in by phone circuitry such that a user can utilize a smartphone to log into a workstation.

As an example, a device can include one or more cable storage features. For example, consider an external and/or an internal reel where at least a portion of a cable can be wound and unwound using the reel.

As an example, a device can include a video cable that includes opposing ends; and a human presence sensor operatively coupled to the video cable between the opposing ends. In such an example, the device can include a controller operatively coupled to the video cable between the opposing ends and operatively coupled to the human presence sensor.

As an example, a video cable can include at least two differential pairs for transmission of video data. In such an example, the video cable can include a differential pair for transmission of human presence data.

As an example, a device can include a video cable, a human presence sensor and memory that stores human presence sensor data.

As an example, a device can include a video cable, a human presence sensor and connection circuitry that detects connection of the video cable to at least one of a display device and a computing device. In such an example, the device can include memory that stores human presence sensor data and connection data generated by the connection circuitry. As an example, such a device can include logical states, for example, consider a null state, a human presence state, a connected state, and a human presence and connected state.

As an example, a device can include at least one indicator, which may be, for example, a light such as an LED, a display, etc. In such an example, the device can include a controller that controls a status light to indicate at least one of availability and non-availability of at least a video cable of the device. For example, such a device can include at least one human presence sensor for detecting human presence where detection of human presence can indicate that the video cable of the device is not available due to use by a human with a computing device connected to the video cable.

As an example, a human presence sensor can include an I²C interface (e.g., also abbreviated "I2C"). In such an example, the I²C interface (e.g., SCL and SDA contacts, etc.) may be operatively coupled to a differential pair of a video cable (e.g., a D+/D− pair, a USB specification pair, etc.).

As an example, a human presence sensor can be or include a thermal sensor. For example, such a sensor can have a field of view that may be provided by a lens where the lens is made of a material that can transmit thermal energy (e.g., transmit greater than 50 percent, etc.).

As an example, a device can include a housing between opposing ends of a video cable where, for example, a human presence sensor is carried by the housing (e.g., disposed at least in part in the housing, etc.). In such an example, the housing may include a base.

As an example, a device can include a video cable, a human presence sensor and security circuitry. For example, consider security circuitry that may include a network access key or other network access functionality (e.g., to receive a key, etc.).

As an example, a human presence sensor can include a power interface that is electrically coupled to at least one power conductor of a video cable. In such an example, the human presence sensor can be powered via the video cable. As an example, a device can include a rechargeable battery that can receive power via a video cable where the rechargeable battery can supply power to one or more human presence sensors of the device. In such an example, the device may operate using power supplied by the rechargeable battery, which may be in a state where one or both ends of the video cable are disconnected or which may be in a state where one or both ends of the video cable are connected.

As an example, opposing ends of a video cable can include a male connector at one end receivable by a display device and a male connector at another end receivable by a computing device.

As an example, a video cable can be a USB-C cable. For example, a video cable with at least one USB type C (USB-C) connector. As an example, a video cable may include one or more types of connectors (e.g., USB type B, USB type C, HDMI, DP, etc.).

As an example, a device can include charging circuitry. In such an example, a housing between opposing ends of a cable can include a charging platform.

As an example, a device can include a housing between opposing ends of a cable where the housing can include a display. In such an example, a controller can be operatively coupled to the display for rendering of a graphical user interface. For example, consider a GUI that can render user usage information for usage of the device.

As an example, a device can include a cable, a human presence sensor, memory and transmission circuitry operably coupled to the memory. In such an example, the transmission circuitry can include one or more of RFID circuitry, WiFi circuitry, BLUETOOTH circuitry, LiFi circuitry, etc.

As an example, a device can include one or more types of sensors where at least one of the sensors can be utilized for detection of human presence. As an example, a noise sensor may be utilized as an auxiliary human presence sensor, a vibration sensor may be utilized as an auxiliary human presence sensor, etc. As an example, a device can include one or more environmental sensors in addition to a human presence sensor.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 14:
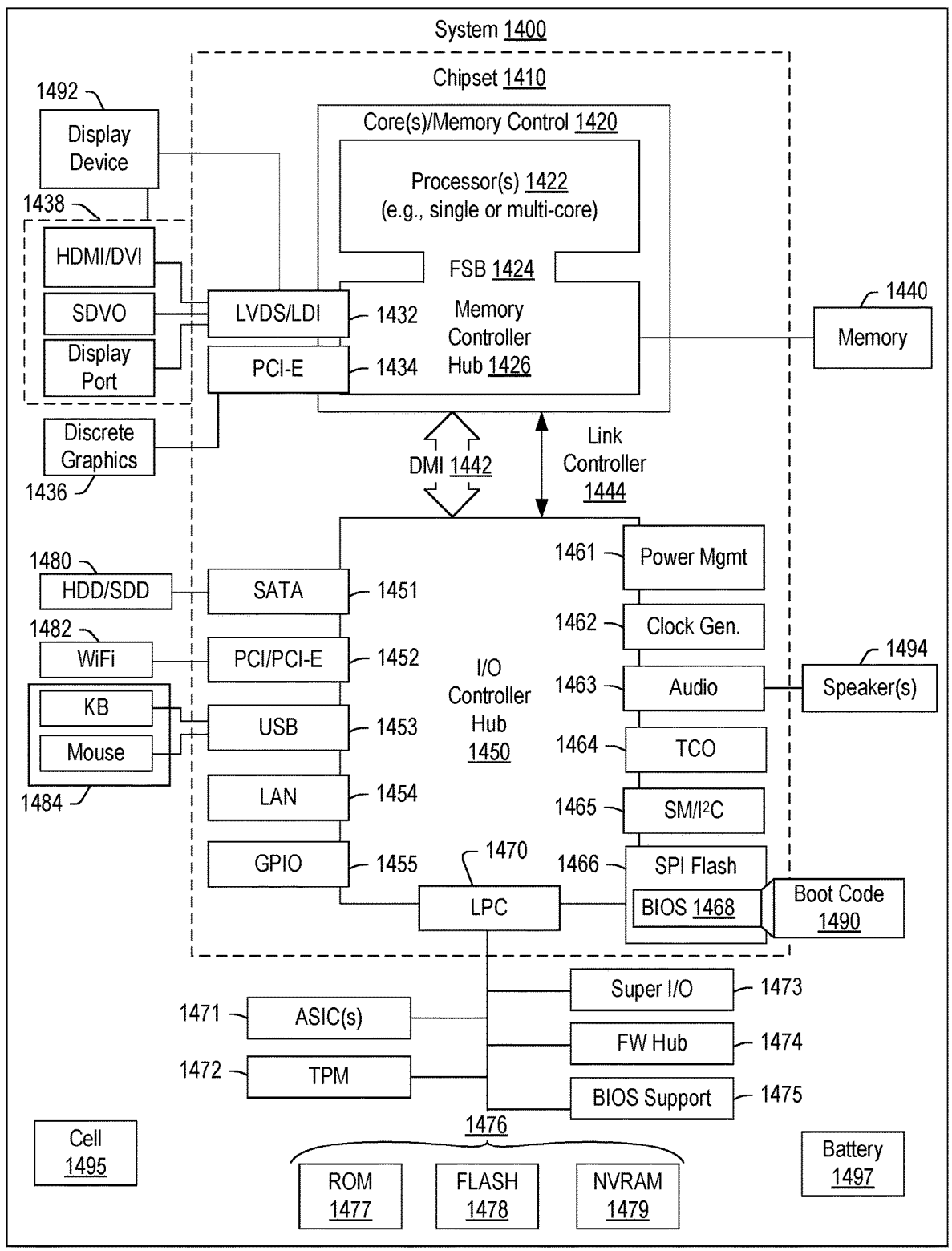
FIG. 14 is a block diagram of an example of a system that includes one or more processors and memory.

While various examples of circuits or circuitry have been discussed, FIG. 14 depicts a block diagram of an illustrative computer system 1400. The system 1400 may be a computer system, such as one of the ThinkCentre® or ThinkPad® series of personal computers sold by Lenovo (US) Inc. of Morrisville, NC, or a workstation computer system, such as the ThinkStation®, which are sold by Lenovo (US) Inc. of Morrisville, NC; however, as apparent from the description herein, a system or other machine may include other features or only some of the features of the system 1400. As an example, the computing device 210 may include one or more features of the system 1400.

As shown in FIG. 14, the system 1400 includes a so-called chipset 1410. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 14, the chipset 1410 has a particular architecture, which may vary to some extent depending on brand or manufacturer. The architecture of the chipset 1410 includes a core and memory control group 1420 and an I/O controller hub 1450 that exchange information (e.g., data, signals, commands, etc.) via, for example, a direct management interface or direct media interface (DMI) 1442 or a link controller 1444. In the example of FIG. 14, the DMI 1442 is a chip-to-chip interface (sometimes referred to as being a link between a "northbridge" and a "southbridge").

The core and memory control group 1420 include one or more processors 1422 (e.g., single core or multi-core) and a memory controller hub 1426 that exchange information via a front side bus (FSB) 1424. As described herein, various components of the core and memory control group 1420 may be integrated onto a single processor die, for example, to make a chip that supplants the conventional "northbridge" style architecture.

The memory controller hub 1426 interfaces with memory 1440. For example, the memory controller hub 1426 may provide support for DDR SDRAM memory (e.g., DDR, DDR2, DDR3, etc.). In general, the memory 1440 is a type of random-access memory (RAM). It is often referred to as "system memory".

The memory controller hub 1426 further includes a low-voltage differential signaling interface (LVDS) 1432. The LVDS 1432 may be a so-called LVDS Display Interface (LDI) for support of a display device 1492 (e.g., a CRT, a flat panel, a projector, etc.). A block 1438 includes some examples of technologies that may be supported via the LVDS interface 1432 (e.g., serial digital video, HDMI/DVI, display port). The memory controller hub 1426 also includes one or more PCI-express interfaces (PCI-E) 1434, for example, for support of discrete graphics 1436. Discrete graphics using a PCI-E interface has become an alternative approach to an accelerated graphics port (AGP). For example, the memory controller hub 1426 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1450 includes a variety of interfaces. The example of FIG. 14 includes a SATA interface 1451, one or more PCI-E interfaces 1452 (optionally one or more legacy PCI interfaces), one or more USB interfaces 1453, a LAN interface 1454 (more generally a network interface), a general purpose I/O interface (GPIO) 1455, a low-pin count (LPC) interface 1470, a power management interface 1461, a clock generator interface 1462, an audio interface 1463 (e.g., for speakers 1494), a total cost of operation (TCO) interface 1464, a system management bus interface (e.g., a multi-master serial computer bus interface) 1465, and a serial peripheral flash memory/controller interface (SPI Flash) 1466, which, in the example of FIG. 14, includes BIOS 1468 and boot code 1490. With respect to network connections, the I/O hub controller 1450 may include integrated gigabit Ethernet controller lines multiplexed with a PCI-E interface port. Other network features may operate independent of a PCI-E interface.

The interfaces of the I/O hub controller 1450 provide for communication with various devices, networks, etc. For example, the SATA interface 1451 provides for reading, writing or reading and writing information on one or more drives 1480 such as HDDs, SDDs or a combination thereof. The I/O hub controller 1450 may also include an advanced host controller interface (AHCI) to support one or more drives 1480. The PCI-E interface 1452 allows for wireless connections 1482 to devices, networks, etc. The USB interface 1453 provides for input devices 1484 such as keyboards (KB), one or more optical sensors, mice and various other devices (e.g., microphones, cameras, phones, storage, media players, etc.). On or more other types of sensors may optionally rely on the USB interface 1453 or another interface (e.g., I²C, etc.). As to microphones, the system 1400 of FIG. 14 may include hardware (e.g., audio card) appropriately configured for receipt of sound (e.g., user voice, ambient sound, etc.).

In the example of FIG. 14, the LPC interface 1470 provides for use of one or more ASICs 1471, a trusted platform module (TPM) 1472, a super I/O 1473, a firmware hub 1474, BIOS support 1475 as well as various types of memory 1476 such as ROM 1477, Flash 1478, and non-volatile RAM (NVRAM) 1479. With respect to the TPM 1472, this module may be in the form of a chip that can be used to authenticate software and hardware devices. For example, a TPM may be capable of performing platform authentication and may be used to verify that a system seeking access is the expected system.

The system 1400, upon power on, may be configured to execute boot code 1490 for the BIOS 1468, as stored within the SPI Flash 1466, and thereafter processes data under the control of one or more operating systems and application software (e.g., stored in system memory 1440). An operating system may be stored in any of a variety of locations and accessed, for example, according to instructions of the BIOS 1468. Again, as described herein, a satellite, a base, a server or other machine may include fewer or more features than shown in the system 1400 of FIG. 14. Further, the system 1400 of FIG. 14 is shown as optionally include cell phone circuitry 1495, which may include GSM, CDMA, etc., types of circuitry configured for coordinated operation with one or more of the other features of the system 1400. Also shown in FIG. 14 is battery circuitry 1497, which may provide one or more battery, power, etc., associated features (e.g., optionally to instruct one or more other components of the system 1400). As an example, a SMBus may be operable via a LPC (see, e.g., the LPC interface 1470), via an I²C interface (see, e.g., the SM/I²C interface 1465), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A device comprising:
   a video cable that comprises opposing ends;
   a human presence sensor operatively coupled to the video cable between the opposing ends;
   a status light; and
   a controller that controls the status light to indicate at least one of availability and non-availability of the video cable and a display device, wherein the video cable is connected at one of the opposing ends to the display device, and wherein the controller changes the status light from indicating availability to indicating non-availability responsive to detection of human presence.

2. The device of claim 1, wherein the controller is operatively coupled to the video cable between the opposing ends and operatively coupled to the human presence sensor.

3. The device of claim 1, wherein the video cable comprises at least two differential pairs for transmission of video data.

4. The device of claim 3, wherein the video cable comprises a differential pair for transmission of human presence data.

5. The device of claim 1, comprising memory that stores human presence sensor data.

6. The device of claim 1, comprising connection circuitry that detects connection of the video cable to at least one of a display device and a computing device.

7. The device of claim 6, comprising memory that stores human presence sensor data generated by the human presence sensor and connection data generated by the connection circuitry.

8. The device of claim 6, comprising logical states that comprise a null state, a human presence state, a connected state, and a human presence and connected state.

9. The device of claim 1, wherein the human presence sensor comprises a thermal sensor.

10. The device of claim 1, wherein the device comprises a housing between the opposing ends.

11. The device of claim 10, wherein the human presence sensor is carried by the housing.

12. The device of claim 10, wherein the housing comprises a display, wherein the controller is operatively coupled to the display for rendering of a graphical user interface to the display, wherein the graphical user interface operates as the status light that indicates the at least one of availability and non-availability of at least the video cable.

13. The device of claim 1, wherein the video cable is a USB-C cable.

14. The device of claim 1, wherein the human presence sensor comprises a power interface that is electrically coupled to at least one power conductor of the video cable.

15. The device of claim 1, comprising memory and transmission circuitry operably coupled to the memory.

16. The device of claim 1, comprising at least two human presence detection sensors.

17. The device of claim 1, comprising at least one environmental sensor.

18. A device comprising:
a video cable that comprises opposing ends;
a human presence sensor operatively coupled to the video cable between the opposing ends;
connection circuitry that detects connection of the video cable to at least one of a display device and a computing device; and
logical states that comprise a null state, a human presence state, a connected state, and a human presence and connected state.

19. The device of claim 18, wherein the video cable is connected to the display device, the human presence state corresponds to presence of a human without connection of the computing device to the video cable, the connected state corresponds to connection of the computing device to the video cable without presence of a human, and the human presence and connected state corresponds to presence of a human with connection of a computing device to the video cable.

20. A device comprising:
a video cable that comprises opposing ends;
a human presence sensor operatively coupled to the video cable between the opposing ends;
a status light; and
a controller that controls the status light to indicate at least one of availability and non-availability of at least the video cable,
wherein the opposing ends of the video cable comprise a first end and a second end, wherein, for the first end being connected to a display device, the controller determines logical states that comprise a first state that corresponds to detection of a computing device connected to the second end of the video cable and detection of human presence, a second state that corresponds to detection of a computing device connected to the second end of the video cable without detection of human presence, a third state that corresponds to detection of human presence without detection of a computing device connected to the second end of the video cable, and a fourth state that corresponds to no detection of human presence and no detection of a computing device connected to the second end of the video cable, and wherein the controller controls the status light based at least in part on a transition from one of the logical states to another one of the logical states.

* * * * *